United States Patent
Kim et al.

(10) Patent No.: US 12,079,664 B2
(45) Date of Patent: Sep. 3, 2024

(54) EDGE COMPUTING SYSTEM AND METHOD FOR RECOMMENDING CONNECTION DEVICE

(71) Applicant: SAMSUNG ELECTRONICS CO., LTD., Suwon-si (KR)

(72) Inventors: Moohyun Kim, Suwon-si (KR); Jongwon Lee, Suwon-si (KR); Gajin Song, Suwon-si (KR); Sunkee Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/093,586

(22) Filed: Jan. 5, 2023

(65) Prior Publication Data

US 2023/0141055 A1 May 11, 2023

Related U.S. Application Data

(63) Continuation of application No. PCT/KR2021/009495, filed on Jul. 22, 2021.

(30) Foreign Application Priority Data

Jul. 22, 2020 (KR) .................. 10-2020-0091113

(51) Int. Cl.
*G06F 9/50* (2006.01)
*G06F 11/30* (2006.01)

(52) U.S. Cl.
CPC ........ *G06F 9/5072* (2013.01); *G06F 11/3006* (2013.01)

(58) Field of Classification Search
CPC ........................ G06F 9/5072; G06F 11/3006
See application file for complete search history.

(56) References Cited

U.S. PATENT DOCUMENTS 10,341,868 B2 7/2019 Ross et al.
10,460,258 B2 10/2019 Sugaya
(Continued)

FOREIGN PATENT DOCUMENTS

JP 7052218 4/2022
KR 10-2018-0119162 11/2018
(Continued)

OTHER PUBLICATIONS

International Search Report for PCT/KR2021/009495 mailed Oct. 22, 2021, 4 pages.

*Primary Examiner* — Kostas J Katsikis
(74) *Attorney, Agent, or Firm* — Nixon & Vanderhye, P.C.

(57) ABSTRACT

An electronic device may include a communication module, a memory, and a processor operatively connected to the communication module and the memory, wherein the processor is configured to: transmit device information of the electronic device to an external server using the communication module; receive, from the external server, first recommendation information including a list of at least one external device which can be connected to the electronic device through edge computing; request transmission of operation state information from the at least one external device included in the first recommendation information; acquire the operation state information of the at least one external device; and, based on the operation state information of the at least one external device, acquire second recommendation information including a list of at least one external device to be connected through edge computing.

15 Claims, 16 Drawing Sheets

(56) References Cited

U.S. PATENT DOCUMENTS

| | | |
|---|---|---|
| 11,038,678 B2 | 6/2021 | Asanghanwa et al. |
| 11,134,127 B2 | 9/2021 | Lee et al. |
| 2014/0099938 A1 | 4/2014 | Calo et al. |
| 2019/0158370 A1 | 5/2019 | You et al. |
| 2019/0158606 A1 | 5/2019 | Guim Bernat et al. |
| 2020/0351336 A1* | 11/2020 | Campbell ........... H04L 67/1008 |
| 2021/0352090 A1 | 11/2021 | Kim et al. |

FOREIGN PATENT DOCUMENTS

| | | |
|---|---|---|
| KR | 10-2019-0056957 | 5/2019 |
| KR | 10-2019-0083091 | 7/2019 |
| KR | 10-2019-0138293 | 12/2019 |
| KR | 10-2020-0005507 | 1/2020 |
| KR | 10-2020-0007754 | 1/2020 |
| KR | 10-2020-0033092 | 3/2020 |

\* cited by examiner

EDGE COMPUTING SYSTEM AND METHOD FOR RECOMMENDING CONNECTION DEVICE

CROSS-REFERENCE TO RELATED APPLICATIONS

This application is a continuation of International Application No. PCT/KR2021/009495 designating the United States, filed on Jul. 22, 2021 in the Korean Intellectual Property Receiving Office and claiming priority to KR Patent Application No. 10-2020-009113 filed on Jul. 22, 2020 in the Korean Intellectual Property Office, the disclosures of each of which are incorporated by reference herein in their entireties.

BACKGROUND

Field

The disclosure relates to an edge computing system and, more specifically, to an edge computing system including a leaf device, an edge device, and a cloud server, and a method for recommending a device for connection in the edge computing system.

Description of Related Art

Cloud computing technology provides a user with a computing resources existing in a location different from that of a user through a network, to provide a computing service such as a server, a storage, software, and analysis. User data or contents collected from an Internet of Things (IoT) device, for example, are stored in a cloud server and are then processed to provide a cloud service to the user.

Cloud computing is utilized to process data generated on the IoT. In cloud computing, as the amount of data and the number of devices in the IoT increase, the system may be overloaded, and security or privacy issues may occur in the process of data delivery and/or storage. Further, in case that an error occurs in the cloud server or Internet connection is not established, the service cannot be provided.

In order to solve certain problems of cloud computing, edge computing technology is used. Edge computing is an open architecture which extends cloud computing and some of the services to a device on an edge end of a network. For example, if edge computing technology is utilized for IoT, an application or service in which low latency and privacy are important, among applications or services processed in a cloud server, may be processed on an edge device in a partially distributed manner.

SUMMARY

Although edge computing technology is being used for IoT, conventional edge computing service provides a service through a fixed module to a fixed edge device. For example, an edge device, which is connected to at least one leaf device and equipped with software and/or hardware for processing data, should exist in a home network.

Conventionally, edge computing service may be unavailable depending on the state of the edge device (e.g., movement or lack of resources), and resources for edge computing should be secured.

Various example embodiments of the disclosure identify devices available for edge-leaf connection in a network and recommend a device suitable for the connection.

Technical problems to be solved by the systems and methods in the disclosure are not limited to the technical problems mentioned above, and other technical problems not mentioned may be clearly understood from the description below.

An electronic device according to various embodiments may include: a communication module; a memory; and a processor operatively connected to the communication module and the memory, wherein the processor is configured to: transmit device information of the electronic device to an external server using the communication module; receive, from the external server, first recommendation information including a list of at least one external device which is connectable to the electronic device through edge computing; request transmission of operation state information from the at least one external device included in the first recommendation information; acquire the operation state information of the at least one external device; and acquire second recommendation information including a list of at least one external device to be connected through edge computing, based on the operation state information of the at least one external device.

A method for recommending a connection device by an IoT server according to various embodiments may include: storing device information received from multiple electronic devices; receiving a device registration request from a first electronic device; generating first recommendation information including a list of at least one electronic device, which is connectable to the first electronic device through edge computing, among the multiple electronic devices, based on the stored device information; transmitting the first recommendation information to the first electronic device; receiving, from the first electronic device, operation state information of the at least one electronic device included in the first recommendation information; and based on the operation state information, generating second recommendation information including a list of at least one external device which is connectable to the first electronic device through the edge computing, or receiving the second recommendation information from the first electronic device.

A method for recommending a connection device by an electronic device according to various embodiments may include: transmitting device information of the electronic device to an external server; receiving, from the external server, first recommendation information including a list of at least one external device which is connectable to the electronic device through edge computing; requesting transmission of operation state information from the at least one external device included in the first recommendation information; acquiring the operation state information of the at least one external device, and based on the operation state information of the at least one external device, acquiring second recommendation information including a list of at least one external device to be connected through edge computing.

Various embodiments of the disclosure may provide, for example, an edge computing system and a connection device recommendation method capable of identifying devices available for edge-leaf connection in a network and recommending a device suitable for the connection.

In addition, various effects identified directly or indirectly through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
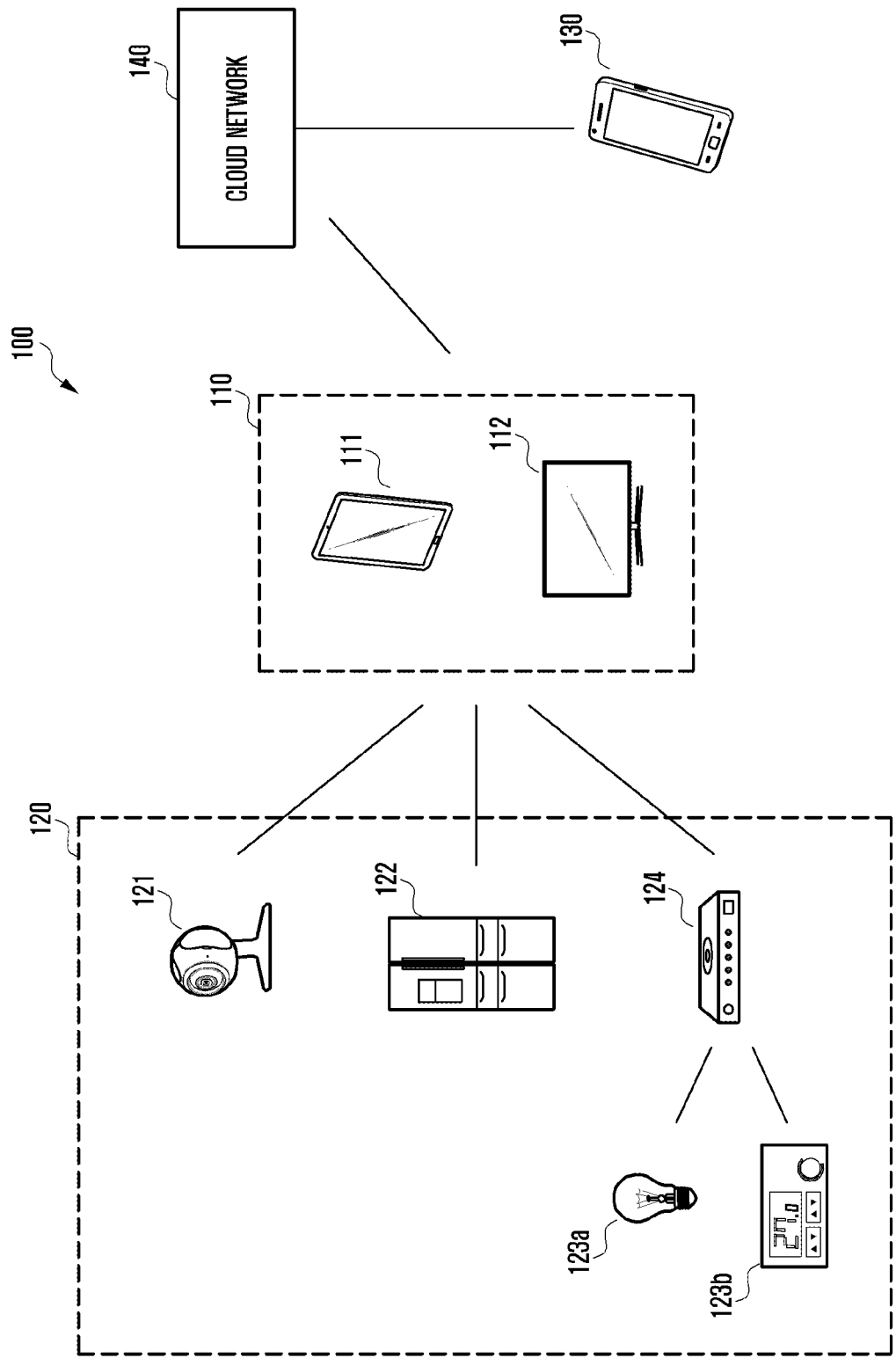
FIG. 1 illustrates devices in an example IoT environment according to various embodiments.

FIG. 1 illustrates devices in an example IoT environment (or IoT system) according to various embodiments.

Referring to FIG. 1, an Internet of things (IoT) system (or an edge computing system) 100 may include at least one leaf device 120, at least one edge device 110, a user device 130, and a cloud network 140. For example, the leaf device 120, the edge device 110, and the user device 130 may be disposed in adjacent locations (e.g., in a house) with each other and connected to the same home network (e.g., the same access point (AP)). In addition, the cloud network 140 may be connected to the leaf device 120, the edge device 110, and the user device 130 through the Internet, while being remotely located.

In an example embodiment, devices within the edge computing system 100 are classified into and described as the leaf device 120, the edge device 110, and the user device 130 according to the function and operation thereof. However, the same device (e.g., a smart phone or tablet PC) may operate as one of the leaf device 120, the edge device 110, and the user device 130 in various cases. In other words, the names and definitions of devices described in this disclosure do not limit the functions and/or operations of the devices.

According to various embodiments, the leaf device 120 may collect various data using a sensor as the end point of an IoT environment and transmit the collected data to the edge device 110 or a cloud network 140. In addition, the leaf device 120 may perform various operations according to a command transmitted from the cloud network 140 or the user device 130. Referring to FIG. 1, a device such as a camera 121, a refrigerator 122, a light bulb 123a, and a digital thermometer (or thermostat) 123b may correspond to the leaf device 120.

The leaf device 120 may access the cloud network 140 through the Internet, and devices (e.g., the light bulb 123a and the digital thermometer 123b), which do not support an Internet protocol, among the leaf devices 120 may transmit data obtained by sensing to a hub device 124 based on non-IP based communication (e.g., Bluetooth or Zigbee) which supports an Internet protocol. Further, the hub device 124 may transmit the sensing data of each of leaf devices 123a and 123b to the cloud network 140 through the Internet. The detailed configuration and operation of the leaf device 120 will be described in more detail with reference to FIG. 5.

According to various embodiments, the cloud network 140 is located on a network and may include various server devices (e.g., an IoT management server and an IoT hub server) supporting cloud computing services in an IoT environment. The cloud network 140 may, for example, perform computing processing on the sensing data received from the leaf device 120 and transmit a command for controlling the leaf device 120.

According to various embodiments, the cloud network 140 may perform a function of operating and managing a specific device in the home network to operate as the edge device 110. For example, the cloud network 140 includes an IoT server (e.g., an IoT management server and an IoT hub server), and the IoT server may perform an edge computing service such as registration, connection, and management of the edge device 110 and the leaf device 120 and provide a module (e.g., a device module or a service module) required for the edge computing service to the edge device 110.

According to various embodiments, the edge device 110 may directly process data received from the leaf device 120 or transmit the data to the cloud network 140 (e.g., an IoT server). The edge device 110 may correspond to a device including hardware and/or software resources required for an edge computing service, such as a TV 112 and a tablet PC 111. The edge device 110 may be connected to the cloud network 140 through the Internet, and may establish a home network with the leaf device 120.

According to various embodiments, multiple edge devices 110 may exist in the home network, and the leaf device 120 may be connected to one of the multiple edge devices 110 so as to transmit data. When a specific leaf device 120 is connected as above, the edge device 110 may download a module (e.g., a device module or a service module) required for the edge computing service from the cloud network 140 and execute the downloaded module.

According to various embodiments, the edge device 110 may perform a device-unique function (e.g., an image output function of a TV), and may perform edge computing services through hardware and software resources at least partially concurrently with the performance of the device-unique function or during an idle time during which no device-unique function is performed.

A detailed configuration and operation of the edge device 110 will be described in more detail with reference to FIG. 4.

According to various embodiments, the user device 130 may provide various user interfaces related to edge computing services through an application. For example, the user device 130 may display, on a display, data (e.g., camera video streaming) acquired from the leaf device 120 or result data (e.g., person recognition) obtained by processing the acquired data in the edge device 110 or the cloud network 140. In addition, the user device 130 may receive a user input such as connection of the edge device 110 and/or the leaf device 120 and server registration, and transmit the received user input to the cloud network 140. A detailed configuration and operation of the user device 130 will be described in more detail with reference to FIG. 3.

Various example embodiments of the disclosure may dynamically implement an edge computing service using a device having idle computing power in a home network. To this end, when a specific leaf device is connected in the home network, the edge computing system may provide a recommendation for at least one edge device, which is connectable to the leaf device, among multiple edge devices in the home network.

Figure 2A:
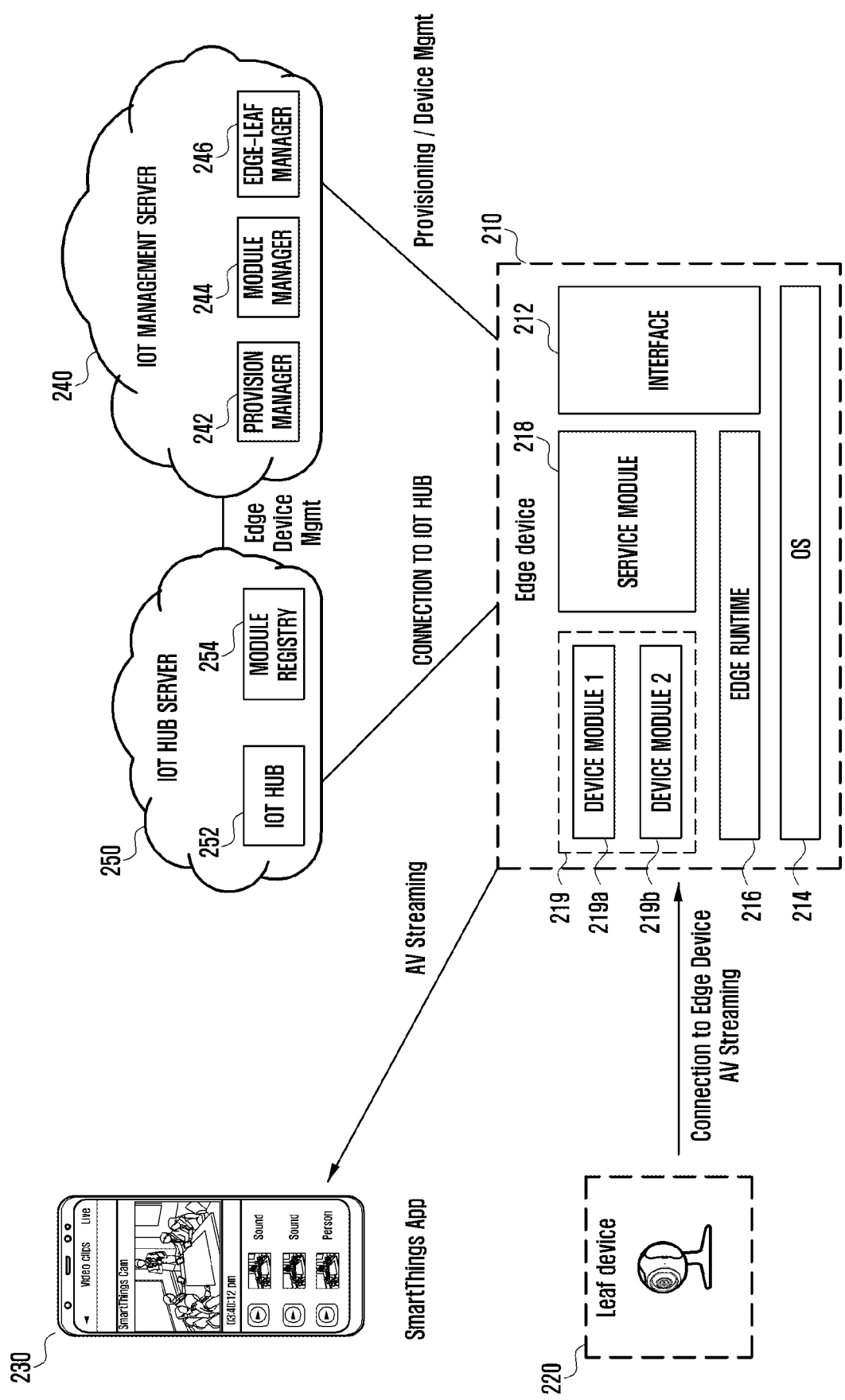
FIGS. 2A and 2B illustrate devices of an example edge computing system according to various embodiments.
Figure 2B:
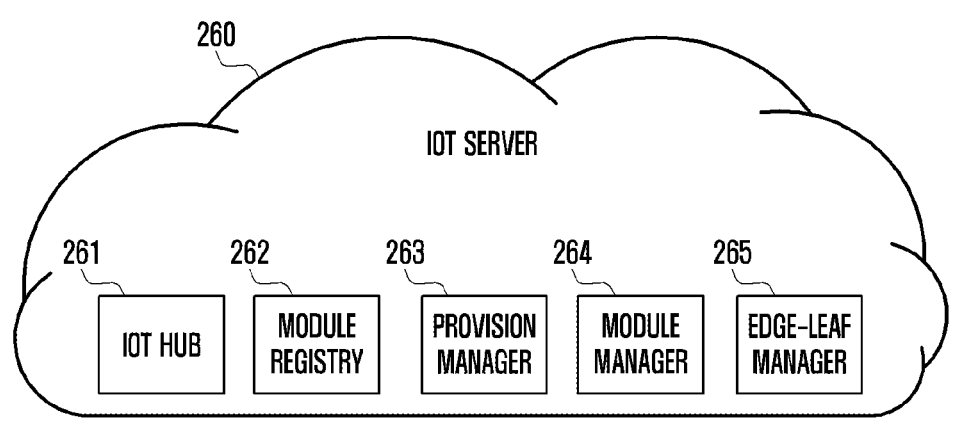

FIGS. 2A and 2B illustrate respective devices of an example edge computing system according to various embodiments.

Referring to FIG. 2A, the edge computing system may include a leaf device 220, an edge device 210, a user device 230, an IoT hub server 250, and an IoT management server 240. As described with reference to FIG. 1, various IoT devices may exist on a home network, and in FIG. 2, one leaf device (e.g., the camera 121 of FIG. 1) and one edge device (e.g., the TV 112 of FIG. 1) will be described by way of example without limitation.

According to various embodiments, the IoT management server 240 (e.g., SmartThings server) is a server device configured to provide various services for determination, connection, and operation of edge computing services, and may include a provision manager 242, a module manager 244, and an edge-leaf manager 246.

According to various embodiments, the provision manager 242 may perform a function of relaying, in the middle, to enable the edge device 210 to be connected to an IoT hub server 250. For example, when the edge device 210 is initially registered in the IoT management server 240, the provision manager 242 may provide a connection string enabling connection of the edge device 210 to the IoT hub server 250.

According to various embodiments, the module manager 244 may manage information on various modules provided for edge computing services and devices supporting each service. Here, a module required to perform the edge computing service may include a device module 219 enabling the edge device 210 to transmit data, which is transmitted from the leaf device 220, to an external server (e.g., the IoT hub server 250), and a service module 218 including programs executed to implement a service in the edge device 210 based on data transmitted from the leaf device 220.

According to various embodiments, the edge-leaf manager 246 may manage a connection state between the edge device 210 and the leaf device 220 existing in several home networks. For example, when the edge device 210 and the leaf device 220, which are registered in the IoT management server 240, are connected or disconnected from each other, the edge device 210 and/or the leaf device 220 may transmit connection or disconnection information to the IoT management server 240, and the IoT management server 240 may store information about which edge device 210 and leaf device 220 are connected in real time, and which service is being performed.

According to various embodiments, the IoT hub server 250 supports a cloud computing platform, and may provide data required for the leaf device 220 and the edge device 210 in the cloud environment to be connected to each other. The IoT hub server 250 may include an IoT hub 252 and a module registry 254.

According to various embodiments, the module registry 254 may be a storage of modules (e.g., the device module 219 and the service module 218) required to perform an edge computing service.

According to various embodiments, the IoT hub 252 may maintain a connection with the edge device 210, may provide a module stored in the module registry 254 to the edge device 210, and may maintain information of modules installed in various edge devices 210.

According to various embodiments, the edge device 210 (e.g., the edge device 110 of FIG. 1) may have device-unique functions such as a TV, a tablet PC, and a laptop PC, and may be a device including a hardware and/or software configuration (e.g., an edge runtime or basic module) for an edge computing service. The edge computing services may be performed through hardware and/or software resources at least partially concurrently with the performance of the device-unique function or during an idle time during which no device-unique function is performed.

According to various embodiments, the edge device 210 may include an interface 212, an operating system 214, and an edge runtime 216 for communication with the cloud (e.g., the IoT management server 240 or the IoT hub server 250).

The edge runtime 216 and basic module for edge computing may be installed in the edge device 210 through a process or software upgrade of the edge device 210. Here, the edge runtime 216 may include a daemon program for interworking with the IoT server, and the basic module may be configured as a container as a program required for communication with the IoT server. For example, the edge device 210 may require hardware conditions (e.g., CPU performance) for operating the operating system 214, and may be configured as a real time operating system (RTOS).

According to various embodiments, when the edge device 210 is connected to a specific leaf device 220, the edge device may receive and install at least one module for performing an edge computing service from the IoT hub server 250.

Here, the at least one module may be determined according to the type of the leaf device 220 for connection and the type of service that may be performed, and may include the device module 219 corresponding to the corresponding leaf device 220 and the service module 218 corresponding to the type of service to be performed. When the edge device 210 is connected to multiple leaf devices 220, each leaf device 220 and a corresponding device module 219 (e.g., device module 1 219a or device module 2 219b) may be installed. The edge device 210 is connected to the IoT hub server 250 by executing the edge runtime 216 in a provisioning process, and the at least one module may be additionally installed and executed according to the type of the leaf device 220. The edge device 210 may activate or deactivate the edge mode according to a command received from the IoT hub server 250 or the IoT management server 240. When the edge mode is deactivated, the edge device 210 may perform only a unique function (e.g., an image output function of a TV), and the device module 219 and the service module 218 may not be executed.

According to various embodiments, the leaf device 220 (e.g., the leaf device 120 of FIG. 1) may transmit data, which is acquired using a sensor, to the edge device 210 or a cloud network (e.g., the IoT management server 240 or the IoT hub server 250) connected thereto. For example, in a case of an Internet protocol (IP) camera operating as the leaf device 220, the camera may be connected to the edge device 210 to transmit video streaming to the edge device 210.

According to various embodiments, the user device 230 may be a device, such as a smart phone or a tablet PC, including a display capable of displaying a user interface (UI) and executing various applications. The user device 230 may install and execute an application for the edge computing service, and may receive a content and a notification generated by the leaf device 220 through the application. When the edge device 210 and the leaf device 220 are connected, the content or notification generated by the leaf device 220 may be transmitted to the user device 230 through the edge device 210.

According to various embodiments, the functions of the IoT hub server 250 and the IoT management server 240 may be performed by one server device (e.g., the IoT server 260 of FIG. 2B). For example, referring to FIG. 2B, the IoT server 260 may include an IoT hub 261 (e.g., the IoT hub 252 in FIG. 2A) which is a configuration of the IoT hub server 250 and the IoT management server 240 described above, a module registry 262 (e.g., the module registry 254 in FIG. 2A), a provision manager 263, a module manager 264 (e.g., the module manager 244 in FIG. 2A), and an edge-leaf manager 265 (e.g., the edge-leaf manager 246 in FIG. 2A).

Alternatively, the functions may be performed by three or more server devices. For example, respective configurations of the IoT hub server 250 and the IoT management server 240 of FIG. 2A can be arranged in a distributive manner by three or more server devices existing on the network, or some operations performed in each configuration may also performed in a distributive manner by multiple server devices.

Figure 3:
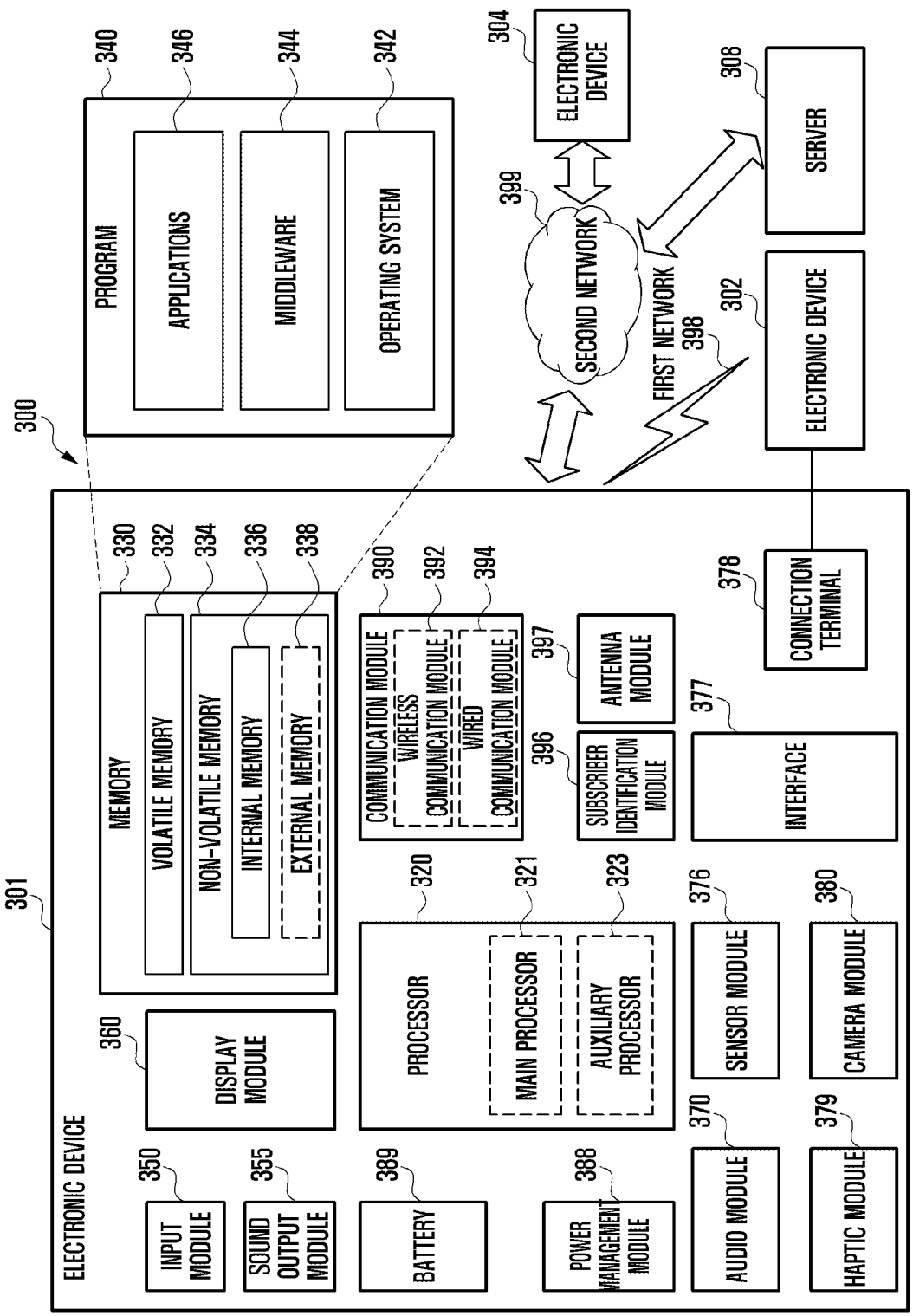
FIG. 3 is a block diagram of an example user device within a network environment according to various embodiments.

FIG. 3 is a block diagram of an example user device in a network environment according to various embodiments. Hereinafter, a user device of an edge computing system (e.g., the user device 130 of FIG. 1 or the user device 230 of FIG. 2A) may be referred to as an electronic device 301.

FIG. 3 is a block diagram illustrating an electronic device 301 in a network environment 300 according to various embodiments. Referring to FIG. 3, the electronic device 301 in the network environment 300 may communicate with an electronic device 302 via a first network 398 (e.g., a short-range wireless communication network), or at least one of an electronic device 304 or a server 308 via a second network 399 (e.g., a long-range wireless communication network). According to an embodiment, the electronic device 301 may communicate with the electronic device 304 via the server 308. According to an embodiment, the electronic device 301 may include a processor 320, memory 330, an input module 350, a sound output module 355, a display module 360, an audio module 370, a sensor module 376, an interface 377, a connection terminal 378, a haptic module 379, a camera module 380, a power management module 388, a battery 389, a communication module 390, a subscriber identification module (SIM) 396, or an antenna module 397. In various embodiments, at least one of the components (e.g., the connecting terminal 378) may be omitted from the electronic device 301, or one or more other components may be added in the electronic device 301. In various embodiments, some of the components (e.g., the sensor module 376, the camera module 380, or the antenna module 397) may be implemented as a single component (e.g., the display module 360).

The processor 320 may execute, for example, software (e.g., a program 340) to control at least one other component (e.g., a hardware or software component) of the electronic device 301 coupled with the processor 320, and may perform various data processing or computation. According to an embodiment, as at least part of the data processing or computation, the processor 320 may store a command or data received from another component (e.g., the sensor module 376 or the communication module 390) in volatile memory 332, process the command or the data stored in the volatile memory 332, and store resulting data in non-volatile memory 334. According to an embodiment, the processor 320 may include a main processor 321 (e.g., a central processing unit (CPU) or an application processor (AP)), or an auxiliary processor 323 (e.g., a graphics processing unit (GPU), a neural processing unit (NPU), an image signal processor (ISP), a sensor hub processor, or a communication processor (CP)) that is operable independently from, or in conjunction with, the main processor 321. For example, when the electronic device 301 includes the main processor 321 and the auxiliary processor 323, the auxiliary processor 323 may be adapted to consume less power than the main processor 321, or to be specific to a specified function. The auxiliary processor 323 may be implemented as separate from, or as part of the main processor 321.

The auxiliary processor 323 may control at least some of functions or states related to at least one component (e.g., the display module 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). According to an embodiment, the auxiliary processor 323 (e.g., an image signal processor or a communication processor) may be implemented as part of another component (e.g., the camera module 380 or the communication module 390) functionally related to the auxiliary processor 323. According to an embodiment, the auxiliary processor 323 (e.g., the neural processing unit) may include a hardware structure specified for artificial intelligence model processing. An artificial intelligence model may be generated by machine learning. Such learning may be performed, e.g., by the electronic device 301 where the artificial intelligence is performed or via a separate server (e.g., the server 308). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 or the non-volatile memory 334.

The program 340 may be stored in the memory 330 as software, and may include, for example, an operating system (OS) 342, middleware 344, or an application 346.

The input module 350 may receive a command or data to be used by another component (e.g., the processor 320) of the electronic device 301, from the outside (e.g., a user) of the electronic device 301. The input module 350 may include, for example, a microphone, a mouse, a keyboard, a key (e.g., a button), or a digital pen (e.g., a stylus pen).

The sound output module 355 may output sound signals to the outside of the electronic device 301. The sound output module 355 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 360 may visually provide information to the outside (e.g., a user) of the electronic device 301. The display module 360 may include, for example, a display, a hologram device, or a projector and control circuitry to control a corresponding one of the display, hologram device, and projector. According to an embodiment, the display module 360 may include a touch sensor adapted to detect a touch, or a pressure sensor adapted to measure the intensity of force incurred by the touch.

The audio module 370 may convert a sound into an electrical signal and vice versa. According to an embodiment, the audio module 370 may obtain the sound via the input module 350, or output the sound via the sound output module 355 or a headphone of an external electronic device (e.g., an electronic device 302) directly (e.g., wiredly) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. According to an embodiment, the sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 377 may support one or more specified protocols to be used for the electronic device 301 to be coupled with the external electronic device (e.g., the electronic device 302) directly (e.g., wiredly) or wirelessly. According to an embodiment, the interface 377 may include, for example, a high definition multimedia interface (HDMI), a universal serial bus (USB) interface, a secure digital (SD) card interface, or an audio interface.

A connection terminal 378 may include a connector via which the electronic device 301 may be physically connected with the external electronic device (e.g., the electronic device 302). According to an embodiment, the connection terminal 378 may include, for example, a HDMI connector, a USB connector, a SD card connector, or an audio connector (e.g., a headphone connector).

The haptic module 379 may convert an electrical signal into a mechanical stimulus (e.g., a vibration or a movement) or electrical stimulus which may be recognized by a user via his tactile sensation or kinesthetic sensation. According to an embodiment, the haptic module 379 may include, for example, a motor, a piezoelectric element, or an electric stimulator.

The camera module 380 may capture a still image or moving images. According to an embodiment, the camera module 380 may include one or more lenses, image sensors, image signal processors, or flashes.

The power management module 388 may manage power supplied to the electronic device 301. According to an embodiment, the power management module 388 may be implemented as at least part of, for example, a power management integrated circuit (PMIC).

The battery 389 may supply power to at least one component of the electronic device 301. According to an embodiment, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the application processor (AP)) and supports a direct (e.g., wired) communication or a wireless communication. According to an embodiment, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as Bluetooth™ wireless-fidelity (Wi-Fi) direct, or infrared data association (IrDA)) or the second network 399 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 392 may identify and authenticate the electronic device 301 in a communication network, such as the first network 398 or the second network 399, using subscriber information (e.g., international mobile subscriber identity (IMSI)) stored in the subscriber identification module 396.

The wireless communication module 392 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 392 may support a high-frequency band (e.g., the mmWave band) to achieve, e.g., a high data transmission rate. The wireless communication module 392 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 392 may support various requirements specified in the electronic device 301, an external electronic device (e.g., the electronic device 304), or a network system (e.g., the second network 399). According to an embodiment, the wireless communication module 392 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 397 may transmit or receive a signal or power to or from the outside (e.g., the external electronic device) of the electronic device 301. According to an embodiment, the antenna module 397 may include an antenna including a radiating element composed of or including a conductive material or a conductive pattern formed in or on a substrate (e.g., a printed circuit board (PCB)). According to an embodiment, the antenna module 397 may include a plurality of antennas (e.g., array antennas). In such a case, at least one antenna appropriate for a communication scheme used in the communication network, such as the first network 398 or the second network 399, may be selected, for example, by the communication module 390 (e.g., the wireless communication module 392) from the plurality of antennas. The signal or the power may then be transmitted or received between the communication module 390 and the external electronic device via the selected at least one antenna. According to an embodiment, another component (e.g., a radio frequency integrated circuit (RFIC)) other than the radiating element may be additionally formed as part of the antenna module 397.

According to various embodiments, the antenna module 397 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 301 and the external electronic device 304 via the server 308 coupled with the second network 399. Each of the electronic devices 302 or 304 may be a device of a same type as, or a different type, from the electronic device 301. According to an embodiment, all or some of operations to be executed at the electronic device 301 may be executed at one or more of the external electronic devices 302, 304, or 308. For example, if the electronic device 301 should perform a function or a service automatically, or in response to a request from a user or another device, the electronic device 301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 301. The electronic device 301 may provide the outcome, with or without further processing of the outcome, as at least part of a reply to the request. To that end, a cloud computing, distributed computing, mobile edge computing (MEC), or client-server computing technology may be used, for example. The electronic device 301 may provide ultra low-latency services using, e.g., distributed computing or mobile edge computing. In an embodiment, the external electronic device 304 may include an internet-of-things (IoT) device. The server 308 may be an intelligent server using machine learning and/or a neural network. According to an embodiment, the external electronic device 304 or the server 308 may be included in the second network 399. The electronic device 301 may be applied to intelligent services (e.g., smart home, smart city, smart car, or healthcare) based on 5G communication technology or IoT-related technology.

According to various embodiments, the processor 320 may use an application to perform a control related to an edge computing service using an edge device (e.g., the edge device 210 of FIG. 2A) and a leaf device (e.g., the leaf device 220 of FIG. 2A) in a home network.

According to various embodiments, the application may provide a function of registering the edge device and the leaf device in an IoT server (e.g., the IoT management server 240 of FIG. 2A). For example, the processor 320 may discover at least one edge device and a leaf device in the home network using the communication module 390 and receive device information (e.g., identification information and network information) of each device.

The processor 320 may display a list of identified devices on the application. The processor 320 may transmit device information of the edge device or leaf device selected based on a user input to the IoT server and request registration therein. In addition, the processor 320 may receive a name of each device, location information thereof, and the like on the application.

According to various embodiments, the processor 320 may receive second recommendation information including a list of at least one leaf device connectable to the edge device, from the IoT server through the communication module 390. The processor 320 may display the leaf devices included in the second recommendation information on the application, and transmit information on the leaf device selected based on the user input to the IoT server so as to enable a connection between the edge device and the selected leaf device to be established. In addition, the processor 320 may receive the second recommendation information including a list of at least one edge device connectable to the leaf device, from the IoT server through the communication module 390. The processor 320 may display the edge devices included in the second recommendation information on the application, and transmit information of the edge device selected based on the user input to the IoT server so as to enable a connection between the leaf device and the selected edge device to be established.

According to various embodiments, the processor 320 may receive data (e.g., video streaming or sound data), which is acquired by a sensor of the leaf device, through a cloud network from the leaf device in a state in which the edge mode of the edge device is deactivated. Thereafter, when the edge computing service is started, the data acquired from the leaf device is transmitted to the edge device, and the user device may receive sensor data and analysis data directly from the edge device, or may receive the sensor data and analysis data from the edge device through a cloud network (e.g., the cloud network 140 FIG. 1).

Figure 4:
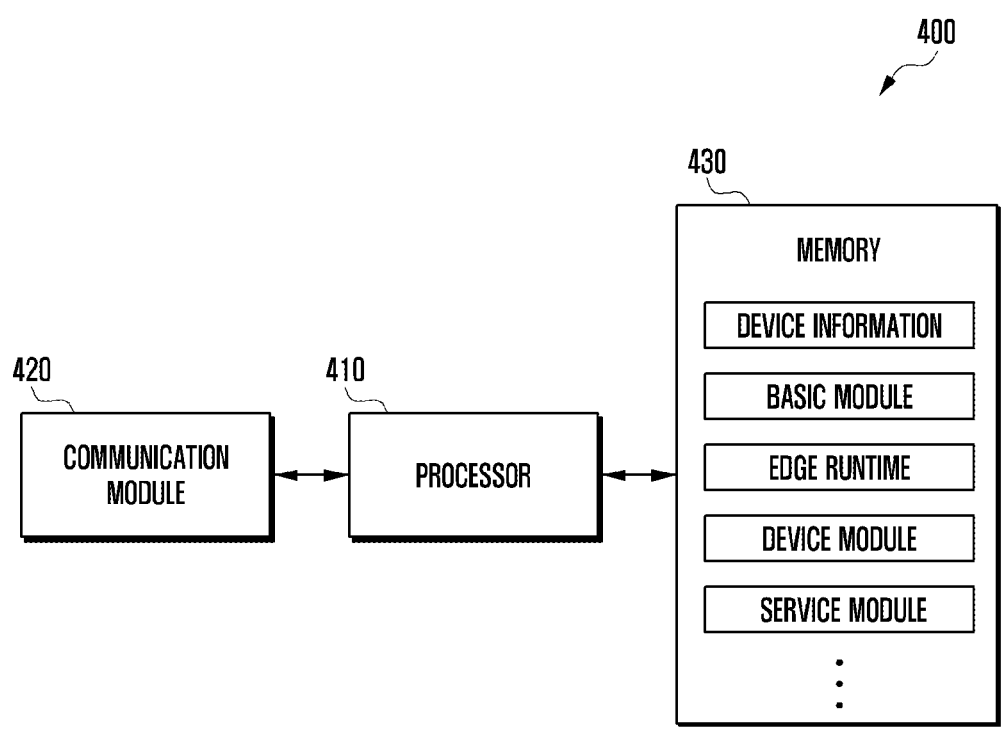
FIG. 4 is a block diagram of an example edge device according to various embodiments.

FIG. 4 is a block diagram of an edge device according to various embodiments.

Referring to FIG. 4, the example edge device 400 according to various embodiments may include a communication module 420, a processor 410, and a memory 430, and even if some of the illustrated elements are omitted or replaced, various embodiments of the disclosure may be implemented.

In an edge computing system according to various embodiments, multiple edge devices may exist, and each edge device may be a different type of device. For example, the edge device 400 may be implemented as a TV, a tablet PC, a laptop PC, or the like. Hereinafter, descriptions of features for the edge device 400 to execute device-specific functions will be omitted, and only operations required to operate as the edge device 400 in the edge computing system will be described.

According to various embodiments, the communication module 420 (e.g., including a communication circuit) supports wireless communication (e.g., Wi-Fi or cellular communication), and may perform data transmission or reception to or from a leaf device (e.g., the leaf device 220 of FIG. 2A), a user device (e.g., the user device 230 of FIG. 2A), and an external server (e.g., the IoT management server or the IoT hub server of FIG. 2A). According to an embodiment, the communication module 420 may be connected via short-range wireless communication, such as near field communication (NFC), Bluetooth, Bluetooth low energy (BLE), Wi-Fi Direct, a mesh network (e.g., ZigBee or z-wave), and/or ultra-wideband (UWB), and may be connected via cellular communication, such as a 4G network and/or a 5G network (e.g., standalone (SA) or non-standalone (NSA)).

According to various embodiments, the memory 430 may include a volatile memory and a non-volatile memory, and may temporarily or permanently store various data used in at least one element (e.g., the processor 410) of the edge device 400. The memory 430 may store various instructions that may be executed by the processor 410. Such instructions may include various control commands including arithmetic and logical operations, data movement, and input/output that may be recognized by the processor 410.

Referring to FIG. 4, the memory 430 may store device information, an edge runtime, a basic module, a device module, and a service module.

According to various embodiments, the device information may include identification information, location information, and network information of the edge device 400. For example, device information may include at least one of a device model name, an account, location information, an executable edge computing service, service capability, a weight configured by users, an online or offline state, a battery state, a resource usage amount, and an edge computing service being executed. At least some of the device information (e.g., location information) may be input by the user on an application of the user device (e.g., the user device 300 of FIG. 3).

According to various embodiments, the edge runtime may include a daemon program for interworking with the IoT server. The edge runtime is not executed when the edge mode of the edge device 400 is deactivated and, in a case of receiving a connection string from the IoT server (e.g., the IoT management server 240 of FIG. 2A), the edge runtime may be executed using the value of the received connection string. For example, the connection string may be data capable of identifying an IoT hub server 650 using an identification (ID) for interworking with the IoT hub server 650.

According to various embodiments, the basic module may be configured as a container as a program required for communication with the IoT server. A basic module for edge runtime and edge computing may be installed in the edge device 400 through a process or software upgrade of the edge device 400. According to an embodiment, the edge device 400 may perform an over the air (OTA) software update as a software upgrade. For example, the OTA software update may include an open mobile alliance (OMA) download, a firmware OTA (FOTA), or a plain FTP (FTP).

According to various embodiments, the edge device 400 may store a device module and a service module, as a module required for an edge computing service. The device module may correspond to each connected leaf device, and the service module may correspond to each service to be performed. That is, multiple device modules and/or service modules may be installed according to the number of connected leaf devices and the number of services to be performed (e.g., the device module 1 219a and device module 2 219b in FIG. 2A).

According to various embodiments, the device module may include programs supporting conversion of data, which is received according to a first protocol from the leaf device, according to a second protocol (e.g., message queue telemetry transport (MQTT)) and transmission of the converted data to an external server. In addition, the service module may include programs that process and/or analyze the received data. According to an embodiment, the first protocol and the second protocol are protocols related to a control channel through which the edge device 400 communicates with the IoT server, and the first protocol may include a web socket. For example, the control channel is a channel for providing and/or processing device information, and the edge device 400 may communicate with the IoT server using the control channel.

During the process or software upgrade of the edge device 400, only the edge runtime and the basic module may be installed, and the device module and the service module may not be installed. Thereafter, when the edge device 400 is connected to the leaf device, the device module and the service module may be downloaded and installed from the IoT server (e.g., the module registry 254 of FIG. 2A).

In addition to the illustrated configuration, the memory 430 may further store various programs for executing a unique function of the edge device 400 (e.g., an image output function of a TV).

According to various embodiments, the processor 410 (e.g., including a processing circuit) may be a configuration capable of performing computation or data processing related to control and/or communication of each element of the edge device 400, and may be operatively, functionally, and/or electrically connected to each element of the edge device 400 such as the communication module 420 and the memory 430.

According to various embodiments, although computation and data processing functions that the processor 410 may implement in the edge device 400 will not be limited, embodiments in which the edge device 400 generates recommendation information including a list of candidate leaf devices that may be connected for an edge computing service will be described below.

According to various embodiments, the processor 410 may register device information of the edge device 400 in the IoT server (e.g., the IoT management server 240 of FIG. 2A).

According to various embodiments, the device information transmitted from the edge device 400 to the IoT server may include fixed device information which is not changed within a short period of time after registration of the edge device 400 and variable device information that may be changed at any time according to the use of the edge device 400. For example, the fixed device information may include at least one of an account, location information, an edge computing service list, user weight information, device model information, and service capability. Here, the account may correspond to an account registered in the IoT server, and the user may register the edge device 400 in the IoT server by logging in with the corresponding account in an application of the user device. The location information may correspond to information about a location (e.g., home, work, or school) in which the edge device 400 is installed and may be input on the application of the user device. The IoT server may classify each device as a universal unique identifier (UUID) string according to the user's account and location information. When determining the edge device 400 and the leaf device to be connected with each other, the IoT server may identify devices having the same account and belonging to the same location.

According to various embodiments, the edge computing service list may include a list of services available by a combination of devices existing in the same location. The edge computing service list may refer to, for example, a list of services that may be provided to a specific leaf device, and may vary according to the type of leaf device. For example, the service list may include an AI vision service that analyzes an image acquired from an IP camera when a leaf device includes the IP camera, and an AI sound analysis service that analyzes sound data acquired from a leaf device when the leaf device includes an AI speaker.

According to various embodiments, the edge device 400 may provide various edge computing services according to data transmitted from the leaf device, and the IoT server may store modules required for each edge computing service.

Examples of edge computing services available for leaf devices and device modules and service modules required accordingly are as follows.

TABLE 1

| Leaf device | Edge computing service | Device module | Service module |
| --- | --- | --- | --- |
| Camera | Face Recognition, Object Detection | MQTT Broker av stream gateway | Face AI, Vision AI (Doorbell Service, Delivery notification) |
| Camera | Daily Summary | MQTT Broker av stream gateway | Face AI, Pet AI (Daily Summary Video Clip) |
| AI speaker | Speaker Recognition | MQTT Broker av stream gateway | Speaker AI (Personized Service) |
| TV | Contents Recognition | MQTT Broker av stream gateway | Contents AI (AD Service, Shopping Service) |
| Robot Vacuum Cleaner | Pet Recognition, Bark detection | MQTT Broker av stream gateway | Pet AI (Pet Service) |

In Table 1, the MQTT broker may refer, for example, to a module that provides a channel for exchanging commands and/or events between the leaf device and the edge device. For example, the message queuing telemetry transport (MQTT) protocol includes a broker, a publisher, and a subscriber, and when an MQTT broker is installed in the edge device (e.g., edge device 810 in FIG. 8), the MQTT broker of the edge device may relay a topic published by the publisher to the subscriber.

The audio video (AV) stream gateway may perform a function of relaying audio and/or video streaming transmitted from the leaf device to the AI module.

According to various embodiments, the user weight information may refer, for example, to weight information input by the user through an application of the user device, and corresponds to a value applied by the user for preferential service execution with respect to a specific service. For example, when multiple leaf devices are to be connected to one edge device 400, the priority or weight of the leaf devices to be connected to the corresponding edge device 400 is determined according to the priorities of services that may be performed by the leaf device.

According to various embodiments, the device model information is information capable of classifying a device type (e.g., a TV, a tablet PC, or a laptop PC) and a device specification, and may include a model name, classification by region, information on classification by communication service provider for example. The device model information may perform a filtering role for a specific service through a policy decision. For example, a face recognition service may be provided only for the edge device 400 of a specific model, a Korean voice recognition service may be provided only for the edge device 400 located in Korea, or a commentary service through live TV recognition may be provided only for customers of a specific communication service provider.

According to various embodiments, service capability refers to hardware and/or software capability of a device, and may include at least one of, for example, whether a specific service module is installed, the presence or absence of resources for hardware acceleration such as an additional GPU, and the presence or absence of resources of an embedded AI solution unit customized to a specific service (e.g., face recognition).

According to various embodiments, the variable device information among the device information may include an online state or not, a battery state, an amount of central processing unit (CPU) or random access memory (RAM) use, and an edge service state.

According to various embodiments, the online state relates to whether the IoT server and the edge device 400 are in a currently connected state. The battery state may include the battery state of the edge device 400 operated by the battery and whether the battery is charged or not. The amount of CPU or RAM use may include an average, maximum, or minimum value of the amount of CPU use or RAM use measured in a predetermined time unit (e.g., 1 minute, 5 minutes, or 30 minutes). The edge service state may include a list of services available in the edge device 400 and a state of a service currently being used.

According to various embodiments, the processor 410 may receive, through the communication module 420, first recommendation information including a list of at least one leaf device which may be connected to the edge device 400 through edge computing. For example, in a state in which multiple leaf devices exist on a home network, the edge device 400 may be added to the home network and registered in the IoT server. In this case, the IoT server may identify device information of the multiple leaf devices on the home network and the edge device 400, and determine at least one leaf device suitable for connection with the edge device 400 based on the device information of each device, so as to transmit the first recommendation information including the list of corresponding leaf devices to the edge device 400.

The IoT server may store and update a service scoring table including a score for a priority when performing an edge computing service while being connected to each leaf device in each edge device 400. The service scoring table may be generated and updated based on device information (or cloud parameters) of each edge device 400 and leaf device, stored in the IoT server. At the time of registration of the edge device 400, the IoT server may identify the leaf devices having the same account and belonging to the same location as those of the edge device 400, and identify the scores of the leaf devices in the service scoring table, to select at least one leaf device suitable for connection to the edge device 400. A method in which the IoT server generates the first recommendation information based on device information (or cloud parameters) of each device will be described in more detail with reference to FIGS. 6 and 7.

According to various embodiments, the processor 410 may request transmission of operation state information from at least one leaf device included in the first recommendation information. For example, the operation state information corresponds to information that may be obtained on a local network and includes information related to user privacy and personal information, and may not be stored in the IoT server. For example, the operation state information may include at least a part of whether a device wakes up or sleeps, an application running in the foreground, a connection state of a local network, IP address information, a wireless communication state, or signal strength. For example, the processor 410 may establish a connection with at least one leaf device included in the first recommendation information using the communication module 420, and request transmission of the operation state information through the established connection. Alternatively, the processor 410 may broadcast a request for transmission of operation state information using the communication module 420.

According to various embodiments, the processor 410 may acquire operation state information (or local parameters) from each leaf device.

According to various embodiments, the processor 410 may generate second recommendation information including a list of at least one leaf device to be connected to the edge device 400 based on the identified operation state information. The second recommendation information may include at least a part of at least one leaf device included in the first recommendation information.

According to various embodiments, the processor 410 may determine a device suitable for connection from among the candidate devices included in the first recommendation information using the following method.

According to various embodiments, the processor 410 may identify whether candidate devices are in an online state, and exclude a device in an offline state as a device unavailable for the service. The processor 410 may exclude a device located at a different location from the edge device 400 among the candidate devices. In addition, the leaf device may exclude a device in which a service module related to data of the leaf device is not installed.

According to an embodiment, the processor 410 may calculate a score according to a weight for each operation state information obtained from a local network. For example, depending on the sleep state of the device, the score may be calculated such that AWAKE=0, DIM=1, SCREEN_OFF=2, CPU_OFF=3, and POWER_OFF=4. In a case of a foreground application, the score may be calculated such that GAME=1, VIDEO=1, SNS=0.5, AUDIO=0.3, and Others=0.2 depending on the category of the application currently running in the foreground. In a case of battery state, as a value according to the battery state of a device and the remaining battery capacity, the value may be calculated such that PLUGED=0, FULL_CHARGED=0, EMPTY=1, and STATUS=(1.0-remaining battery capacity/100). The amount of CPU use may be calculated based on a percentage of the CPU load. The amount of RAM use may be calculated based on a percentage of the RAM load. The processor 410 may calculate a score for each leaf device by adding a weight to each operation state information calculated as described above.

According to an embodiment, the processor 410 may transmit the operation state information obtained from each leaf device to the IoT server through the communication module 420. In this case, the IoT server may generate second recommendation information based on the operation state information received from the edge device 400 and transmit the generated second recommendation information to the edge device 400. A method for determining, by the IoT server, at least one leaf device to be included in the second recommendation information may be the same as the above-described method.

According to various embodiments, at least a part of the device information used when the IoT server generates the first recommendation information and the operation state information used when the edge device 400 generates the second recommendation information may overlap or change. For example, the amount of CPU use or RAM use and battery state may be periodically reported to the IoT server by each device and updated from time to time in the IoT server, and the IoT server may generate the first recommended information using the amount of CPU or RAM use and battery state updated at the time of generation of the first recommendation information. On the other hand, the amount of CPU or RAM use and battery state are not reported to the IoT server and may only be provided to other devices on the local network. In this case, the device information (or cloud parameter) used when the IoT server generates the first recommendation information does not include the amount of CPU or RAM use and battery state, and the edge device 400 may identify the amount of CPU or RAM use and battery of each device in the local network and generate the second recommendation information.

According to various embodiments, the processor 410 may transmit the generated second recommendation information to the IoT server. The IoT server may transmit the second recommendation information to the user device (e.g., the user device 230 of FIG. 2A and the user device 300 of FIG. 3), and the user device may display a list of leaf devices included in the second recommendation information on the application, and may select at least one leaf device to be connected to the edge device 400.

The IoT server may transmit information on at least one leaf device selected by the user device to the edge device 400. The processor 410 may perform an edge computing service while being connected to a corresponding leaf device based on information received from the IoT server. According to various embodiments, the processor 410 may download, from the IoT server, at least one module for performing the edge computing service based on data transmitted from the corresponding leaf device and install the downloaded at least one module, and may execute the installed module to perform the edge computing service.

For example, when the leaf device selected from the second recommendation information in the user device is an IP camera and an AI speaker, the processor 410 may receive video streaming transmitted from the IP camera and transmit the received video streaming to a cloud network, and may perform an AI vision service for performing video analysis. In addition, the processor 410 may receive sound data transmitted from the AI speaker and transmit the received sound data to the cloud network, and may perform an AI sound analysis service for analyzing the received sound data.

Figure 5:
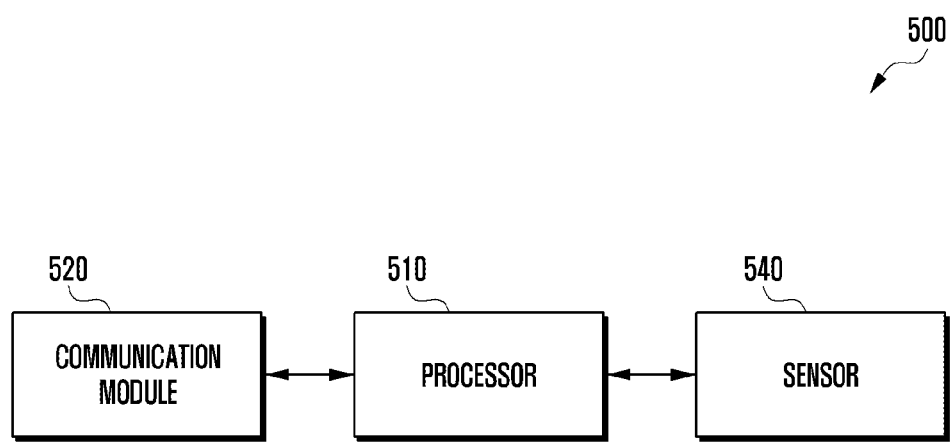
FIG. 5 is a block diagram of an example leaf device according to various embodiments.

FIG. 5 is a block diagram of an example leaf device according to various embodiments.

Referring to FIG. 5, a leaf device 500 according to various embodiments may include a communication module 520, a processor 510, and a sensor 540, and, even if some of the illustrated elements are omitted or replaced, various embodiments of the disclosure may be implemented.

An edge computing system according to various embodiments may include multiple leaf devices 500, and each leaf device 500 may be a different type of device. For example, a leaf device may be implemented as a camera, a refrigerator, a light bulb, a digital thermostat, or the like. Hereinafter, descriptions of features for the leaf device 500 to execute device-specific functions will be omitted, and only operations required to operate as the leaf device 500 in the edge computing system will be described.

According to various embodiments, the communication module 520 (e.g., including a communication circuit) supports wireless communication (e.g., Wi-Fi or cellular communication), and may transmit or receive data to or from an edge device (e.g., the edge device 210 of FIG. 2A or the edge device 400 of FIG. 4), a user device (e.g., the user device 230 of FIG. 2A or the user device 201 of FIG. 3), and an external server (e.g., the IoT management server 240 or the IoT hub server 250 of FIG. 2A).

According to various embodiments, the leaf device 500 may include at least one sensor 540. For example, when the leaf device 500 includes an IP camera, the leaf device may include an image sensor for acquiring surrounding image data, and when the leaf device includes an AI speaker, the leaf device may include a microphone for detecting surrounding sound. Alternatively, a sensor 540 for detecting various data such as temperature, pressure, and an amount of impact may be provided according to the type of the leaf device 500.

According to various embodiments, the processor 510 (e.g., including a processing circuit) is a configuration capable of performing computation or data processing related to control and/or communication of each element of the leaf device 500, and may be operatively, functionally, and/or electrically connected to each element of the leaf device 500, such as a communication module 520 and a sensor 540.

According to various embodiments, the processor 510 may register device information of the leaf device 500 in the IoT server.

According to various embodiments, the device information transmitted from the leaf device 500 to the IoT server may include fixed device information which is not changed within a short period of time after registration of the leaf device 500 and variable device information that may be changed at any time according to the use of the leaf device 500. The fixed device information and the variable device information of the leaf device 500 may be the same as the fixed device information and the variable device information of the edge device described above with reference to FIG. 4.

According to various embodiments, the processor 510 may receive, through the communication module 520, first recommendation information including a list of at least one edge device which may be connected to the leaf device 500 through edge computing. For example, in a state in which multiple edge devices exist on a home network, the leaf device 500 may be added to the home network and registered in the IoT server. In this case, the IoT server may identify device information of the multiple edge devices on the home network and the leaf device 500, and determine at least one edge device suitable for connection with the leaf device 500 based on the device information of each device, to transmit the first recommendation information including the list of corresponding edge devices to the leaf device 500. Alternatively, when a new edge device is added to the home network while the leaf device 500 is connected to a specific edge device, the IoT server may update a service scoring table through the device information of the corresponding edge device and generate first recommendation information, to transmit the generated first recommendation information to the leaf device 500.

A method for generating, by the IoT server, the first recommendation information based on device information (or cloud parameters) of each device may be the same as the method described above with reference to FIG. 4.

According to various embodiments, the processor 510 may request transmission of operation state information from at least one edge device included in the first recommendation information. For example, the processor 510 may establish a connection with at least one edge device using the communication module 520 and request transmission of operation state information through the established connection, or may broadcast a signal including a request for transmission of operation state information.

According to various embodiments, the processor 510 may acquire operation state information (or local parameters) of each edge device from each edge device. The operation state information of the leaf device 500 may be the same as the operation state information of the edge device described above with reference to FIG. 4.

According to various embodiments, the processor 510 may generate second recommendation information including a list of at least one edge device to be connected to the leaf device 500 based on the identified operation state information. The second recommendation information may include at least a part of at least one edge device included in the first recommendation information. A method in which the leaf device 500 generates the second recommendation information based on the operation state information of the edge device may be the same as the method in which the edge device generates the second recommendation information based on the operation state information of the leaf device 500 described above with reference to FIG. 4.

According to various embodiments, the processor 510 may transmit the generated second recommendation information to the IoT server. The IoT server may transmit the second recommendation information to the user device, and the user device may display a list of edge devices of the second recommendation information on the application, and select at least one edge device to be connected to the edge device.

The IoT server may transmit information on at least one edge device selected by the user device to the leaf device 500. The processor 510 may perform an edge computing service while being connected to a corresponding edge device based on information received from the IoT server. For example, data (e.g., video streaming) generated by the leaf device 500 may be transmitted to the IoT server through the edge device.

Figure 6:
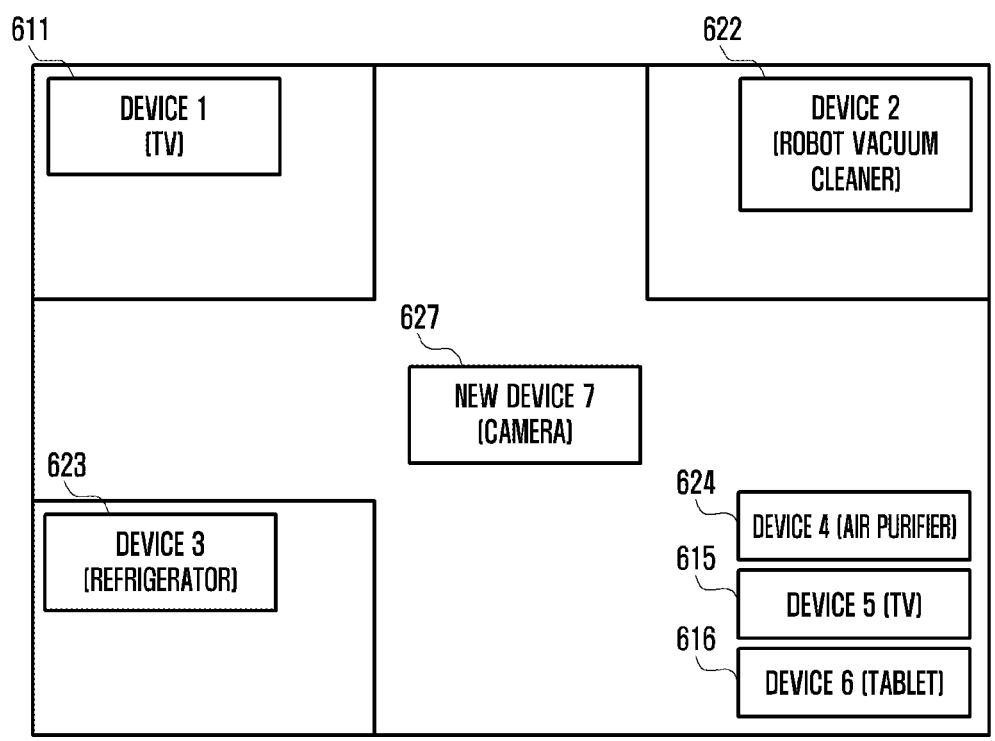
FIG. 6 illustrates the locations of example edge devices and example leaf devices according to various embodiments.

FIG. 6 illustrates locations of example edge devices and example leaf devices according to various embodiments.

Referring to FIG. 6, a first device (TV) 611, a second device (robot vacuum cleaner) 622, a third device (refrigerator) 623, a fourth device (air purifier) 624, a fifth device (TV) 615 and a sixth device (tablet) 616 are already registered in an IoT server (e.g., the IoT management server 240 of FIG. 2A or the IoT server 260 of FIG. 2B), and a seventh device (camera) 627 is to be newly registered in the IoT server.

According to various embodiments, when each device is registered in the IoT server, device information of each device may be transmitted. According to various embodiments, the IoT server may identify whether a corresponding device may operate as an edge device and/or a leaf device based on device information of each device. Alternatively, at the time of registration of each device, a user may input whether the corresponding device may operate as an edge device and/or a leaf device.

Referring to FIG. 6, the first device 611, the fifth device 615, and the sixth device 616 may be registered as edge devices, and the second device 622, the third device 623, and the fourth device 624 may be registered as leaf devices.

According to various embodiments, when a user registers each device using an application of the user device, the user may register location information (e.g., a room or a living room) of the device. For example, the user may perform registration of location information such that the first device 611 is room 1, the second device 622 is room 2, the third device 623 is room 3, and the fourth device 624, the fifth device 615, and the sixth device 616 are living rooms.

When the user requests registration of the seventh device 627 which is a leaf device, the IoT server may determine the fifth device 615 and the sixth device 616, as an edge device suitable for an edge computing service with the seventh device 627 based on the device information of the first device 611 to the sixth device 616.

The seventh device 627 may receive the first recommendation information including the fifth device 615 and the sixth device 616 from the IoT server. The seventh device 627 may establish a connection to the fifth device 615 and the sixth device 616, respectively, in response to the reception of the first recommendation information, and may acquire operation state information of the fifth device 615 and operation state information of the sixth device 616 through the established connection (or by broadcasting a signal including a request for transmission of operation state information).

The seventh device 627 may determine that the fifth device 615 is a device suitable for connection to the seventh device 627 based on the operation state information obtained from the fourth device 624 and the fifth device 615. The seventh device 627 may transmit the second recommendation information including the fifth device 615 to the IoT server, and may be connected to the fifth device 615 according to the selection of the user device to perform an edge computing service.

Figure 7:
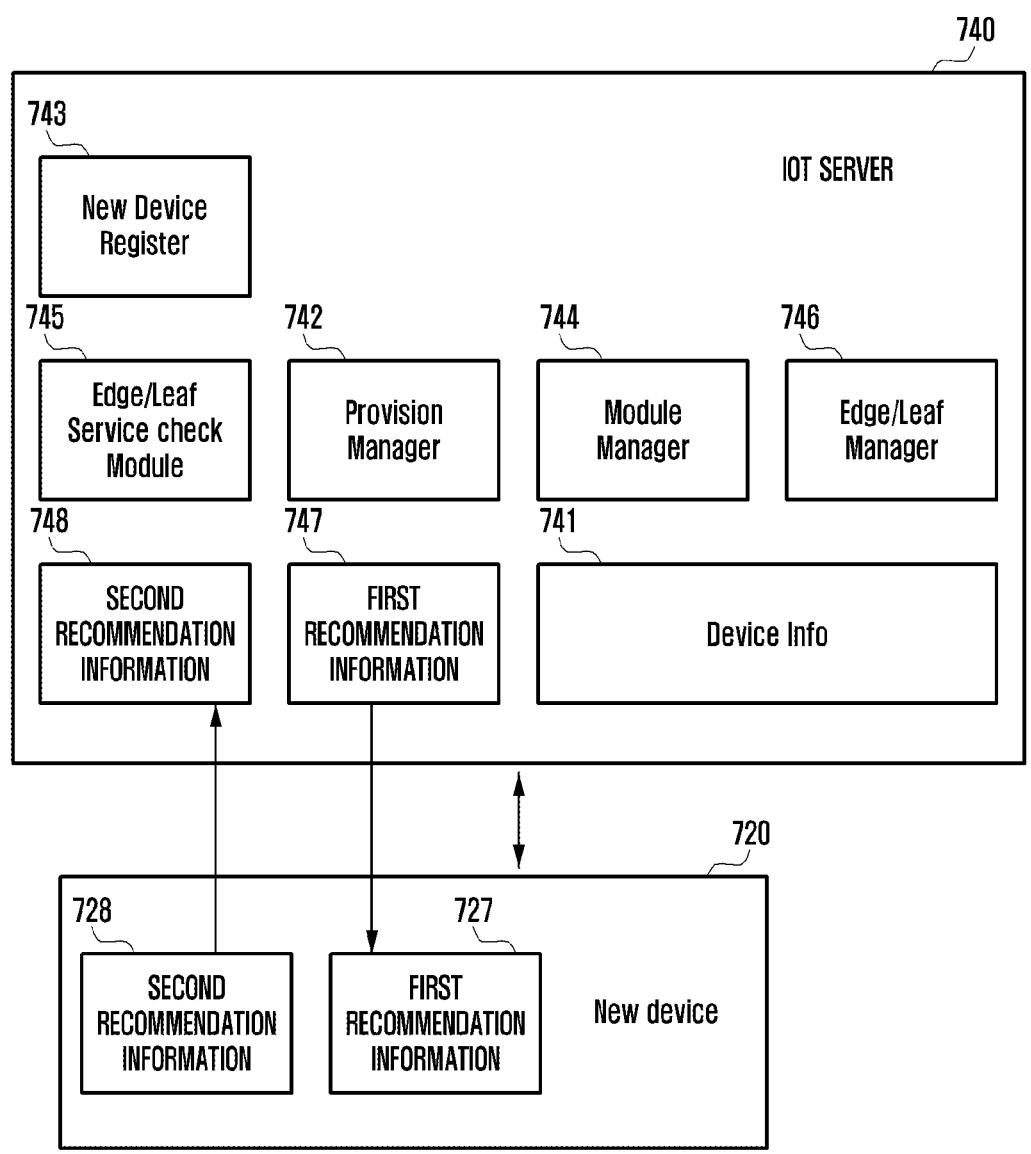
FIG. 7 is a block diagram of an example IoT server and an example leaf device according to various embodiments.

FIG. 7 is a block diagram of an example IoT server and an example leaf device according to various embodiments.

Hereinafter, an operation of an IoT server 740 configured to generate first recommendation information and second recommendation information for an edge device to be connected to the seventh device 627 which is a leaf device will be described based on the situation of FIG. 6.

Referring to FIG. 7, the IoT server 740 may include a provision manager 742, a module manager 744, an edge-leaf manager 746, a device register 743, and an edge-leaf service check module 745.

According to various embodiments, the provision manager 742 (provision manager) may perform a relay function in the middle so as to enable the edge device to be connected to the IoT hub server.

According to various embodiments, the module manager 744 may manage various modules provided for the edge computing service and information on devices supporting each service.

According to various embodiments, the edge-leaf manager 746 may manage a connection state between edge devices and leaf devices existing in several home networks.

According to various embodiments, the IoT server 740 may store device information 741 of several edge devices (e.g., edge devices 611, 615, and 616) and leaf devices (e.g., leaf devices 623, 624, and 625). At the time of registration of the edge devices and leaf devices, location information such as a room and a living room may be registered together therewith. The IoT server 740 may classify devices registered through a specific account and store the classified registered devices as 'my device information'. Device information and location information of edge devices and leaf devices registered through each account and information on whether the device is an edge device or a leaf device may be stored in the 'my device information'.

According to various embodiments, the edge-leaf service check module 745 may identify the state of the registered devices according to information received after registration of the edge device and the leaf devices. For example, the edge-leaf service check module may receive and update variable device information, such as an online or offline state, a battery state, an amount of CPU use, an amount of RAM use, and an edge service state of each device.

According to various embodiments, when a new device requests registration, the device register 743 may perform a process related to registration of the corresponding device. For example, when the seventh device 627 (camera) of FIG. requests registration, the device register may identify the first device 611 to the sixth device 616, which are registered with the same account, through "my device information".

According to various embodiments, the IoT server 740 may determine at least one device suitable for connection with the seventh device 627 based on the device information (or cloud parameters) of the seventh device 627 having requested registration and the first device 611 to the sixth device 616 registered with the same account. For example, the IoT server 740 may identify that the first device 611, the fifth device 615, and the sixth device 616 among the first device 611 to the sixth device 616 are operable as an edge device, and may determine the fifth device 615 and the sixth device 616, in a service scoring table, as devices suitable for connection with the seventh device 627.

According to various embodiments, the IoT server 740 may transmit the first recommendation information 747 including the fifth device 615 and the sixth device 616 to the seventh device 627 having requested registration. The first recommendation information is received by device 720 as first recommendation information 727.

According to various embodiments, the seventh device 627 may establish a connection with the fifth device 615 and the sixth device 616 included in the first recommendation information. The seventh device 627 may acquire operation state information (or local parameter) of each device through the established connection with the fifth device 615 and the sixth device 616 (or by broadcasting a signal including a request for transmission of operation state information).

According to various embodiments, the seventh device 627 may determine the sixth device 616 as a device suitable for connection with the seventh device 627 based on the identified operation state information. The seventh device 627 may transmit the second recommendation information 728 including the sixth device 616 to the IoT server 740. The second recommendation information is received by the IoT server 740 as second recommendation information 748.

According to various embodiments, when a connection with the sixth device 616 is selected by the user device, the seventh device 627 may establish a connection with the sixth device 616 to perform an edge computing service. Here, the sixth device 616 may download a module required for the edge computing service with the seventh device 627 from the IoT server 740 and install the module, and may perform the edge computing service using the installed module.

Figure 8:
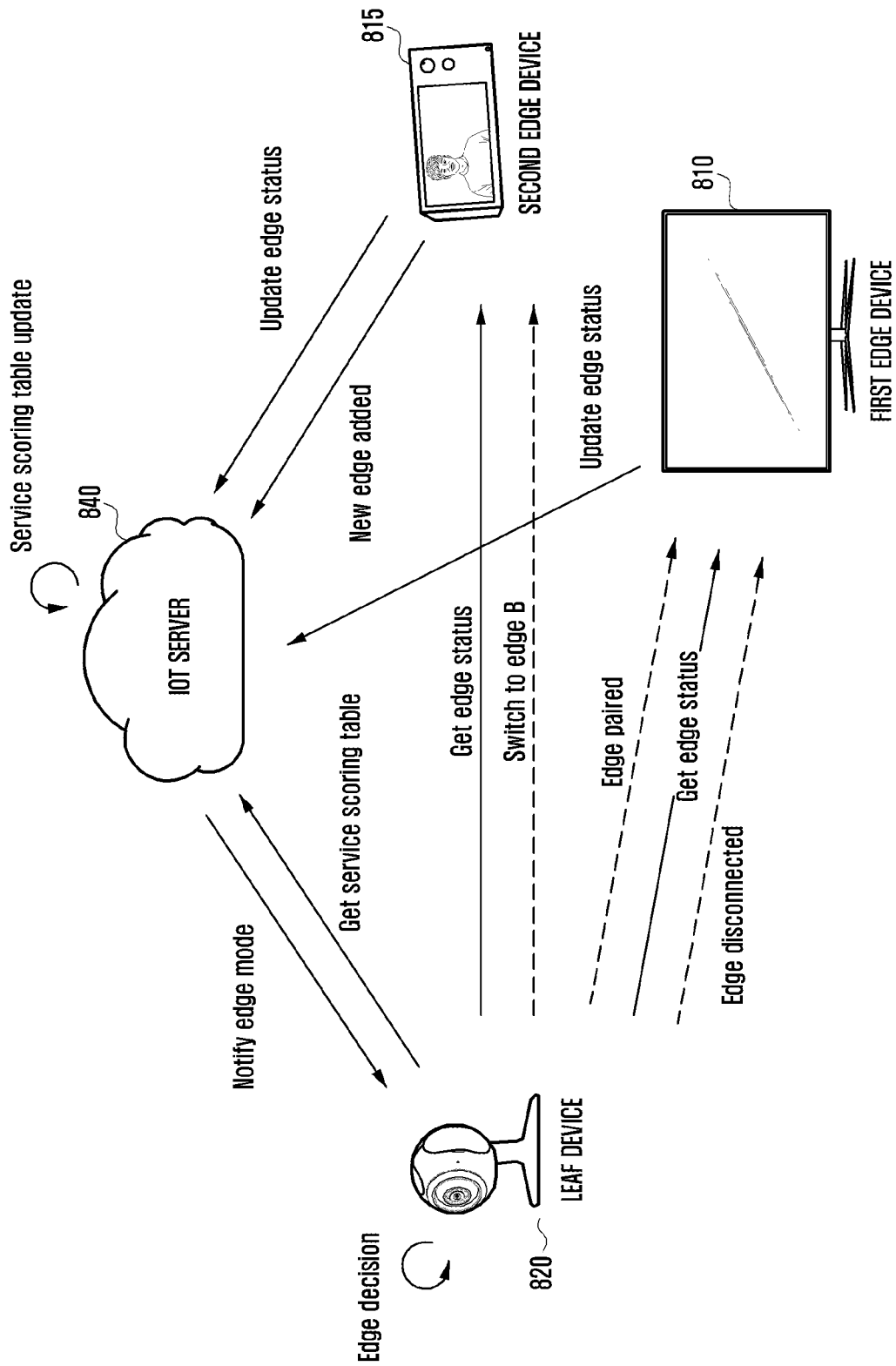
FIG. 8 illustrates an operation of each device of an example edge computing system according to various embodiments.

FIG. 8 illustrates an operation of each device of an example edge computing system according to various embodiments.

In FIG. 8, an IoT server 840 may perform functions of an IoT management server (e.g., the IoT management server 240 of FIG. 2A) and an IoT hub server (e.g., the IoT hub server of FIG. 2A). A first edge device 810, a second edge device 815, and a leaf device 820 may be connected to each other on the same home network.

In this embodiment, the first edge device 810 (e.g., a TV) and the leaf device 820 (e.g., an IP camera) may be connected to each other and be in an edge computing service. For example, device information of the leaf device 820 is registered in the IoT server 840 and, after provisioning, a communication channel for control information and/or event information may be established between the leaf device 820 and the IoT server 840. In addition, device information of the first edge device 810 is registered in the IoT server 840 and, after provisioning, a communication channel for control information and/or event information may be established between the first edge device 810 and the IoT server 840. Thereafter, the first edge device 810 may download a module required for the edge computing service from the IoT server 840 and activate the edge mode. Here, the module required for the edge computing service may include a device module configured to support reception of data transmitted from the leaf device 820 and transmission of the receive data to the cloud network, and a service module including programs for performing the edge computing service based on the received data. For example, the IoT management server may identify an AV module required to transmit the video streaming, which is transmitted from the leaf device 820 in a case that the edge device is an IP camera, to the cloud network, and an AI vision module for performing video analysis in the AI vision service.

The leaf device 820 and the first edge device 810 are mutually authenticated by the IoT server 840, and data (e.g., video streaming) generated by the leaf device 820 may be transmitted to the IoT server 840 by passing through the first edge device 810, and the edge device may perform an edge computing service that analyzes received data using an installed module (e.g., the AI vision module).

According to various embodiments, while the first edge device 810 and the leaf device 820 are connected to each other, the user may additionally register the second edge device 815 in the IoT server 840. For example, after completion of provisioning, the state of the second edge device may be changed to a state in which preparation of the edge computing service for the leaf device 820 is completed.

According to various embodiments, the second edge device 815 may update its own device information in the IoT server 840 (e.g., the edge-leaf manager 246 of FIG. 2A).

According to various embodiments, the device information of the edge device (e.g., the first edge device 810 or the second edge device 815) transmitted to the IoT server 840 may include fixed information which is not changed within a short period of time after registration of the edge device 400 and variable information that may be changed at any time according to the use of the edge device 400.

For example, the fixed information may include at least one of an account, location information, an edge computing service list, user weight information, device model information, and service capability. Here, the account may correspond to an account registered in the IoT server 840, and the user may register the edge device in the IoT server 840 by logging in with the corresponding account in an application of the user device (e.g., the user device 230 of FIG. 2A or the user device 300 of FIG. 3). The location information may correspond to information about a location (e.g., home, work, or school) in which the edge device 400 is installed and may be input on the application of the user device. The IoT server 840 may classify each device as a universal unique identifier (UUID) string according to the user's account and location information. When determining the edge device and the leaf device 820 to be connected with each other, the IoT server 840 may identify devices having the same account and belonging to the same location.

According to various embodiments, the edge computing service list may include a list of services available by a combination of devices existing in the same location. The edge computing service list is a list of services that may be provided to a specific leaf device 820, and may vary according to the type of leaf device. For example, the service list may include an AI vision service that analyzes an image acquired from an IP camera when a leaf device 820 includes the IP camera, and an AI sound analysis service that analyzes sound data acquired from a leaf device when the leaf device 820 includes an AI speaker.

According to various embodiments, the edge device may provide various edge computing services according to data transmitted from the leaf device 820, and the IoT server 840 may store modules required for each edge computing service.

Examples of edge computing services available for the leaf device 820 and device modules and service modules required accordingly are as follows.

TABLE 2

| Leaf device | Edge computing service | Device module | Service module |
| --- | --- | --- | --- |
| Camera | Face Recognition, Object Detection | MQTT Broker av stream gateway | Face AI, Vision AI (Doorbell Service, Delivery notification) |
| Camera | Daily Summary | MQTT Broker av stream gateway | Face AI, Pet AI (Daily Summary Video Clip) |
| AI speaker | Speaker Recognition | MQTT Broker av stream gateway | Speaker AI (Personized Service) |
| TV | Contents Recognition | MQTT Broker av stream gateway | Contents AI (AD Service, Shopping Service) |
| Robot Vacuum Cleaner | Pet Recognition, Bark detection | MQTT Broker av stream gateway | Pet AI (Pet Service) |

According to various embodiments, the user weight information is weight information input by the user through an application of the user device, and corresponds to a value applied by the user for preferential service execution with respect to a specific service. For example, when multiple leaf devices 820 are to be connected to one edge device, the priority or weight of the leaf devices to be connected to the corresponding edge device is determined according to the priorities of services that may be performed by the leaf devices 820.

According to various embodiments, the device model information is information capable of classifying a device type (e.g., a TV, a tablet PC, or a laptop PC) and a device specification, and may include a model name, classification by region, information on classification by communication service provider for example. The device model information may perform a filtering role for a specific service through a policy decision. For example, a face recognition service may be provided only for the edge device of a specific model, a Korean voice recognition service may be provided only for the edge device located in Korea, or a commentary service through live TV recognition may be provided only for customers of a specific communication service provider.

According to various embodiments, service capability refers to hardware and/or software capability of a device, and may include at least one of, for example, whether a specific service module is installed, the presence or absence of resources for hardware acceleration such as an additional GPU, and the presence or absence of resources of an embedded AI solution unit customized to a specific service (e.g., face recognition).

According to various embodiments, the variable device information among the device information may include an online state or not, a battery state, an amount of central processing unit (CPU) or random access memory (RAM) use, and an edge service state.

According to various embodiments, the online state relates to whether the IoT server 840 and the edge device are in a currently connected state. The battery state may include the battery state of the edge device operated by the battery and whether the battery is charged or not. The amount of CPU or RAM use may include an average, maximum, or minimum value of the amount of CPU use or RAM use measured in a predetermined time unit (e.g., 1 minute, 5 minutes, or 30 minutes). The edge service state may include a list of services available in the edge device and a state of a service currently being used.

According to various embodiments, the IoT server 840 may store a service scoring table for each leaf device 820 and an edge device. The service scoring table may store device information of each edge device and device information of the leaf device 820, and accordingly, may include a score for a priority when performing an edge computing service while being connected to a specific leaf device 820 in a specific edge device. For example, the service scoring table may include a score indicating whether multiple devices registered with the same account and belonging to the same location are suitable to be connected to each other for the edge computing service.

According to various embodiments, the IoT server 840 may receive device information of the second edge device 815 and update the service scoring table based on the device information of the second edge device 815.

According to various embodiments, the IoT server 840 may generate first recommendation information based on device information of the leaf device 820, the first edge device 810, and the second edge device 815. For example, the IoT server 840 may identify the score of the first edge device 810 and identify the score of the second edge device 815 in the service scoring table. The first recommendation information may include a list of at least one edge device, which is suitable for connection with the leaf device 820, among multiple edge devices, while including the first edge device 810 and the second edge device 815.

According to various embodiments, the IoT server 840 may transmit the first recommendation information to the leaf device 820. For example, the first recommendation information may include the first edge device 810 and the second edge device 815 as candidates for edge devices to be connected to the leaf device 820.

According to various embodiments, the leaf device 820 may receive operation state information of each edge device included in the first recommendation information. Here, the operation state information corresponds to information obtainable on the local network and includes information related to the user's privacy and personal information, and may not be stored in the IoT server 840. For example, the operation state information may include whether the device wakes up or sleeps, an application running in the foreground, a local network connection state, and IP address information.

According to various embodiments, the leaf device 820 may identify operation state information from the first edge device 810 and the second edge device 815 included in the first recommendation information. The leaf device 820 may generate second recommendation information including a list of at least one edge device to be connected to the leaf device 820 based on the identified operation state information. For example, as a result of identifying whether the first edge device 810 and the second edge device 815 wake up or sleep, the application running in the foreground, the connection state of the local network, and IP address information, when it is determined that the second edge device 815 is more suitable for the edge computing service than the first edge device 810, the second recommendation information may include only the second edge device 815.

According to an embodiment, the leaf device 820 may identify the acquired operation state information of at least one edge device and transmit the identified operations state information to the IoT server 840, and the IoT server 840 may generate second recommendation information based on the operation state information. A method for determining at least one edge device to be included in the second recommendation information by the IoT server 840 may be the same as the method of the aforementioned leaf device 820.

A method in which the leaf device 820 or the IoT server 840 determines at least one device to be included in the second recommendation information among candidate devices of the first recommendation information may be as follows.

For example, the leaf device 820 (or the IoT server 840) may identify whether candidate devices are in an online state, and exclude a device in an offline state as a device unavailable for the service. The leaf device 820 may exclude a device, which is located at a different location from that of the leaf device 820, among the candidate devices. In addition, the leaf device 820 may exclude devices in which a service module related to data of the leaf device 820 is not installed.

According to an embodiment, the leaf device 820 (or the IoT server 840) may calculate a score according to a weight for each operation state information obtained from the local network. For example, depending on the sleep state of the device, the score may be calculated such that AWAKE=0, DIM=1, SCREEN_OFF=2, CPU_OFF=3, and POWER_OFF=4. In a case of a foreground application, the score may be calculated such that GAME=1, VIDEO=1, SNS=0.5, AUDIO=0.3, and Others=0.2 depending on the category of the application currently running in the foreground. In a case of battery state, as a value according to the battery state of a device and the remaining battery capacity, the value may be calculated such that PLUGED=0, FULL_CHARGED=0, EMPTY=1, and STATUS=(1.0-remaining battery capacity/100). The amount of CPU use may be calculated based on a percentage of the CPU load. The amount of RAM use may be calculated based on a percentage of the RAM load. The edge service being executed may be determined according to the number of edge services being executed in each edge device. The leaf device 820 (or the IoT server 840) may calculate a score for each leaf device by adding a weight to each operation state information calculated as described above.

According to various embodiments, the leaf device 820 may transmit the second recommendation information to the IoT server 840, and the IoT server 840 may transmit the second recommendation information to the user device. The user device may display a list of devices included in the second recommendation information on the application and determine an edge device to be connected to the leaf device 820 according to a user input. Thereafter, the leaf device 820 may be connected to an edge device (e.g., the second edge device 815) selected by the user device so as to perform an edge computing service.

Figure 9:
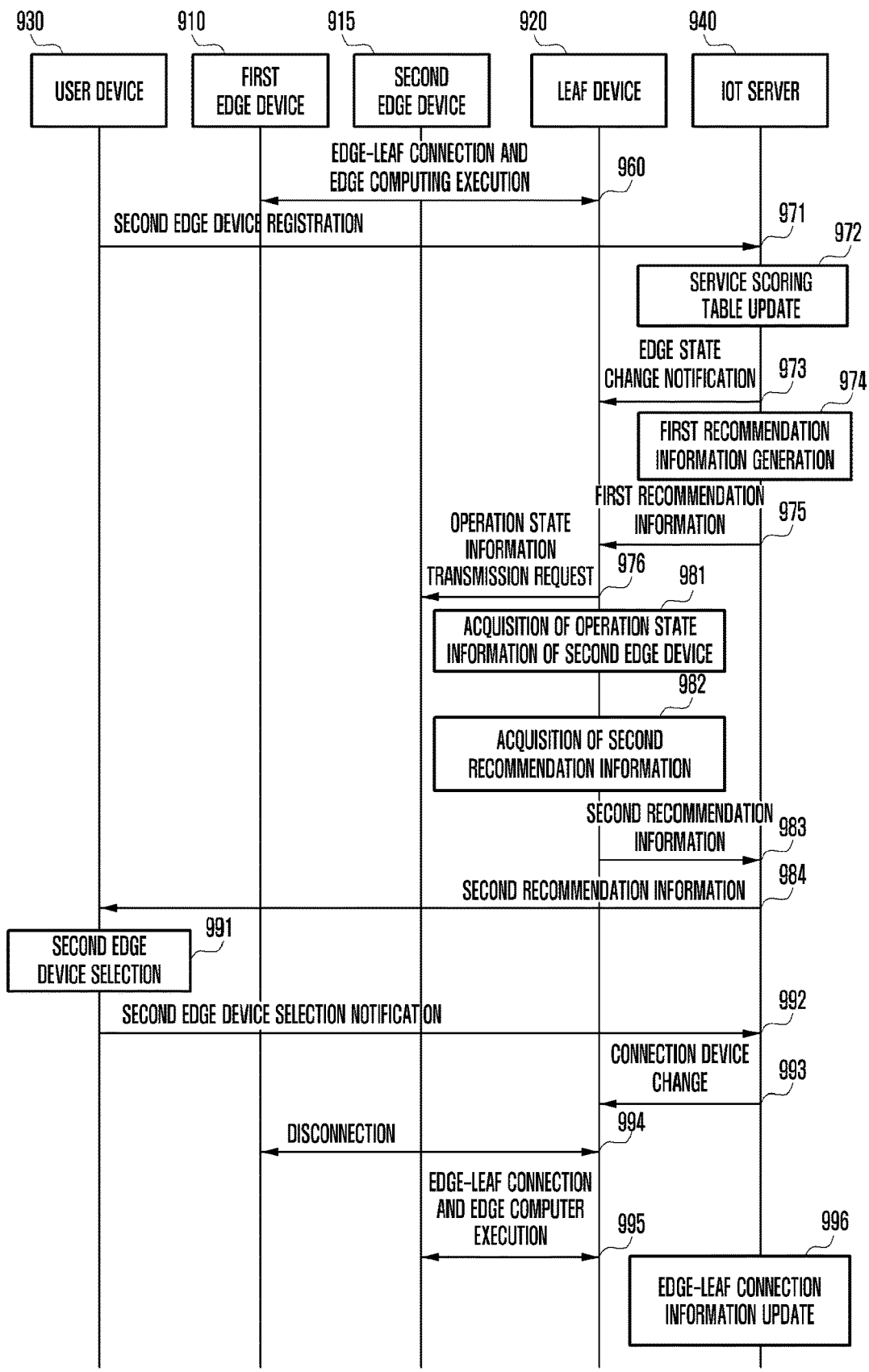
FIG. 9 is a flowchart illustrating a method for recommending a connection device in an example edge computing system according to various embodiments.

FIG. 9 is a flowchart illustrating an example method for recommending a connection device in an edge computing system according to various embodiments.

Referring to FIG. 9, the edge computing system may include a user device 930, a leaf device 920, a first edge device 910, a second edge device 915, and an IoT server 940. The IoT server 940 may include multiple server devices (e.g., the IoT management server 240 and the IoT hub server 250 of FIG. 2A) existing on a cloud network, and respective operations may be performed by multiple server devices in a distributive manner.

According to various embodiments, in operation 960, the first edge device 910 and the leaf device 920 may be connected to be in a state in which an edge computing service is performed.

According to various embodiments, in operation 971, the user may additionally register the second edge device 915 in the IoT server 940 through an application of the user device 930. For example, after completion of provisioning, the state of the second edge device 915 may be changed to a state in which preparation of the edge computing service for the leaf device 920 is completed. The second edge device 915 may update its own device information in the IoT server 940. For example, the device information to be registered may include fixed device information including at least one of location information, an edge computing service list, user weight information, device model information, and service capability, and variable device information including an online state or not, a battery state, and an amount of central processing unit (CPU) or random access memory (RAM) use, and an edge service state. The edge device and leaf device 920 registered in the IoT server 940 may transmit the variable device information to the IoT server 940 periodically or when a predetermined event occurs.

According to various embodiments, in operation 972, a service scoring table may be updated based on device information of the second edge device 915. The service scoring table may store device information of each edge device and device information of the leaf device 920, and, accordingly, may include a score for a priority when performing an edge computing service while being connected to a specific leaf device 920 in a specific edge device. For example, the service scoring table may include a score indicating whether multiple devices registered with the same account and belonging to the same location are suitable to be connected to each other for the edge computing service.

According to various embodiments, in operation 973, the IoT server 940 may transmit an edge state change notification to the leaf device 920.

According to various embodiments, in operation 974, the IoT server 940 may generate first recommendation information based on device information of the leaf device 920, the first edge device 910, and the second edge device 915. For example, the IoT server 940 may identify the score of the first edge device 910 and identify the score of the second edge device 915 in the service scoring table. The first recommendation information may include a list of at least one edge device, which is suitable for connection with the leaf device 920, among multiple edge devices, while including the first edge device 910 and the second edge device 915.

According to various embodiments, in operation 975, the IoT server 940 may transmit the first recommendation information to the leaf device 920. For example, the first recommendation information may include the first edge device 910 and the second edge device 915 as candidates for edge devices to be connected to the leaf device 920.

According to various embodiments, in operation 976, the leaf device 920 may request transmission of operation state information from the second edge device 915 included in the first recommendation information. For example, the leaf device 920 may establish a wireless connection with the second edge device 915 and request transmission of the operation state information through the established connection. According to an embodiment, the leaf device 920 may broadcast a signal including a request for transmission of operation state information.

According to various embodiments, in operation 981, the leaf device 920 may receive operation state information of the first edge device 910 and the second edge device 915. For example, the operation state information may include at least a part of whether the device wakes up or sleeps, an application running in the foreground, a connection state of a local network, IP address information, a wireless communication state, or signal strength. According to various embodiments, at least some of the operation state information and the device information may overlap each other or belong to other information.

According to various embodiments, in operation 982, the leaf device 920 may generate second recommendation information including a list of at least one edge device to be connected to the leaf device 920 based on the identified operation state information. For example, as a result of identifying whether the first edge device 910 and the second edge device 915 wake up or sleep, the application running in the foreground, the connection state of the local network, and the IP address information, when it is determined that the second edge device 915 is more suitable for the edge computing service than the first edge device 910, the second recommendation information may include only the second edge device 915.

According to an embodiment, the leaf device 920 may identify the acquired operation state information of at least one edge device and transmit the identified operations state information to the IoT server 940, and the IoT server 940 may generate second recommendation information based on the operation state information.

According to various embodiments, in operation 983, the leaf device 920 may transmit the acquired second recommendation information to the IoT server 940, and in operation 984, the IoT server 940 may transmit the second recommendation information to the user device 930.

According to various embodiments, in operation 991, the user device 930 may display a list of devices included in the second recommendation information on the application, and determine an edge device to be connected to the leaf device 920 according to a user input. When the second edge device 915 is selected according to the user input, the user device 930 may provide a notification that the second edge device 920 is selected, in operation 992.

According to various embodiments, in operation 993, the IoT server 940 may provide a notification to change a connection device to the second edge device 915 to the leaf device 920.

According to various embodiments, in operation 994, the leaf device 920 may release the connection with the first edge device 910. In this case, the first edge device 910 may deactivate an edge mode and perform only a function unique to the first edge device 910 (e.g., TV image display).

According to various embodiments, an edge computing service may be performed by establishing a connection with the second edge device 915 in operation 995. For example, the leaf device 920 may transmit data (e.g., video streaming) acquired using a sensor to the second edge device 915. The second edge device 915 may analyze data received from the leaf device 920. For example, when the leaf device 920 corresponds to an IP camera, the second edge device 915 may analyze a video received using an AI vision module to provide various video analysis-based services such as face recognition, user recognition, and tracking. Alternatively, when the leaf device 920 corresponds to an AI speaker, the second edge device 915 may analyze sound data using an AI sound analysis module to perform services such as monitoring of pets, window breakage detection, alarm sound detection, and the like. The second edge device 915 may transmit data received from the leaf device 920 and data analyzed by the second edge device 915 to the IoT server 940 in real time.

According to various embodiments, in operation 996, the IoT server 940 may update edge-leaf connection information and provide an edge computing service.

Figure 10:
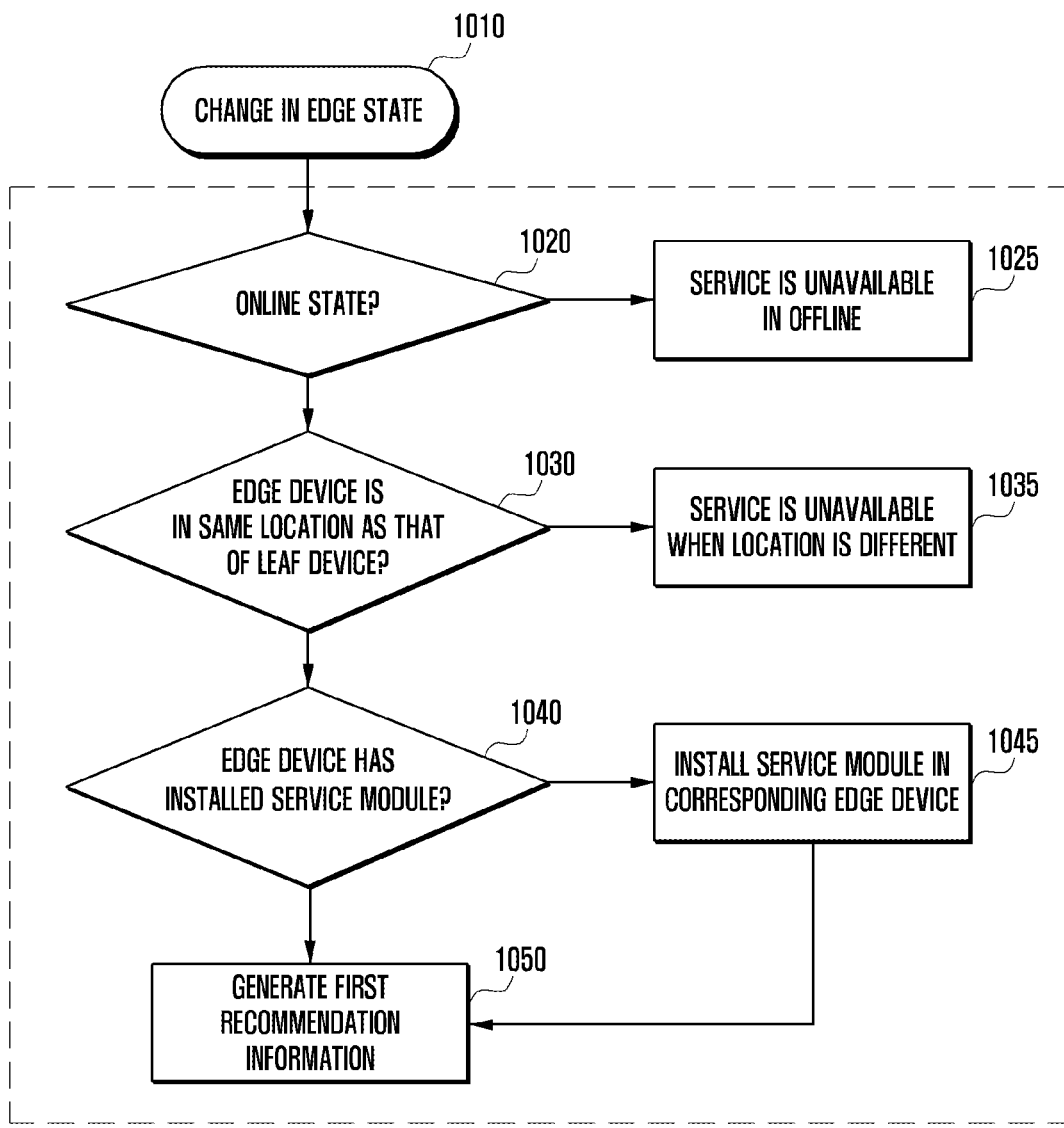
FIG. 10 is a flowchart illustrating an example method of generating first recommendation information based on a cloud parameter according to various embodiments.

FIG. 10 is a flowchart illustrating an example method for generating first recommendation information based on cloud parameters according to various embodiments.

FIG. 10 illustrates an example in which an IoT server (e.g., the IoT server 840 of FIG. 8 or the IoT server 940 of FIG. 9) generates first recommendation information according to cloud parameters including device information of each device stored in the IoT server. Hereinafter, description will be made based on an operation in which the IoT server determines an edge device suitable for connection at the time of registration of a leaf device.

According to various embodiments, the IoT server may generate first recommendation information including a list of at least one device which may be connected to a device, having requested registration, through edge computing, based on the stored device information of the multiple devices. For example, the IoT server may identify whether each device is an edge device or a leaf device and, when the device having requested registration is a leaf device, the IoT server may select a device, which is suitable for connection with the leaf device, among the edge devices having the same account and/or belonging to the same location as that of the leaf device.

According to various embodiments, in operation 1010, the IoT server may detect a change in edge state. For example, when a new leaf device requests registration, the IoT device may detect a change in edge state and generate first recommendation information for the leaf device having requested registration.

According to various embodiments, in operation 1020, the IoT server may identify whether edge devices registered with the same account as the leaf device are in an online state. For example, the IoT server may identify the on/off state of the power of each edge device and whether each edge device is connected to the Internet. In operation 1025, the IoT server may exclude an edge device in an offline state by determining the edge device as a device unavailable for the service.

According to various embodiments, in operation 1030, the IoT server may identify whether each edge device is in the same location as that of the leaf device. For example, at the time of registration of a device, a user may register the location of home, work, school, etc., and the location of a room, living room, etc., in the house, and the IoT server may identify an edge device, which is in the same location as the leaf device having requested registration. In operation 1035, the IoT server may exclude an edge device, which is in a location different from the leaf device, by determining the edge device as a device unavailable for the service.

According to various embodiments, in operation 1040, the IoT server may identify whether each edge device has installed a service module for a leaf device. For example, when the leaf device is an IP camera, an AV module required to transmit video streaming, which is transmitted from the leaf device, to the cloud network, and an AI vision module for performing video analysis in the AI vision service may be required in order for the edge device to perform edge computing. The IoT server may identify a module required for the service for the leaf device based on the device information of each device, and identify whether the module is installed in each edge device. In operation 1045, the IoT server may provide a module required for an edge computing service to an edge device that does not have a corresponding module installed therein.

According to various embodiments, in addition to the above-described information, further based on fixed device information including at least one of location information, an edge computing service list, user weight information, device model information, and service capability, and variable device information including an online state or not, a battery state, an amount of central processing unit (CPU) use or random access memory (RAM) use, and an edge service state, the IoT server may identify whether each device is a device suitable for connection with a leaf device.

In operation 1050, the IoT server may generate first recommendation information and provide the generated first recommendation information to the leaf device.

Figure 11:
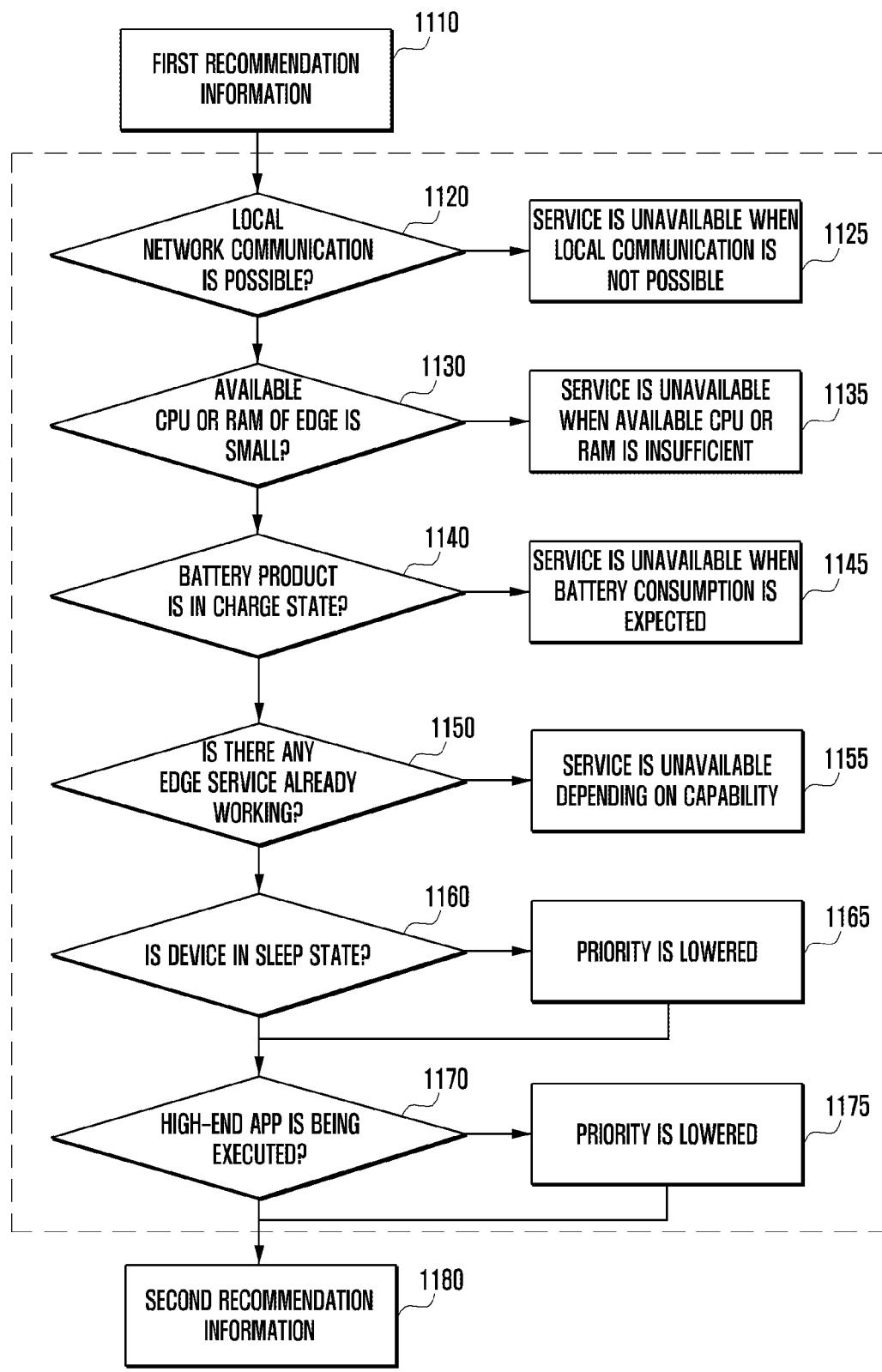
FIG. 11 is a flowchart illustrating an example method of generating second recommendation information based on a local parameter according to various embodiments.

FIG. 11 is a flowchart illustrating an example method for generating second recommendation information based on a local parameter according to various embodiments.

FIG. 11 illustrates a method for generating second recommendation information by a leaf device or an edge device having received the first recommendation information from the IoT server.

According to various embodiments, the leaf device may receive first recommendation information including a list of at least one edge device which may be connected to the leaf device through edge computing. The edge device may receive first recommendation information including a list of at least one leaf device which may be connected to the edge device through edge computing. Hereinafter, description will be made based on the operation of the leaf device.

According to various embodiments, in operation 1110, the leaf device may receive first recommendation information from the IoT server. The first recommendation information is determined based on a cloud parameter stored in the IoT server, and may include a list of at least one edge device having the same account and/or belonging to the same location as that of the leaf device.

According to various embodiments, the leaf device may establish a communication connection with each edge device included in the first recommendation information, and obtain operation state information (or a local parameter) of each edge device. Here, the operation state information is information obtainable on the local network and includes information related to the user's privacy and personal information, and may not be stored in the IoT server. For example, the operation state information may include whether the device wakes up or sleeps, an application running in the foreground, a local network connection state, and IP address information. According to an embodiment, the leaf device may broadcast a signal including a request for transmission of identification information and operation state information of each edge device included in the first recommendation information.

According to various embodiments, in operation 1120, the leaf device may identify whether local network communication in each edge device is possible. In operation 1125, the leaf device may exclude an edge device, in which network communication is not possible, as a device unavailable for the service.

According to various embodiments, in operation 1130, the leaf device may identify whether the available capacity of the CPU and/or RAM of each edge device is smaller than a reference value. In operation 1135, the leaf device may exclude an edge device, the available capacity of the CPU and/or RAM of which is smaller than a reference value, as a device unavailable for the service.

According to various embodiments, in operation 1140, the leaf device may identify the battery state of each edge device and identify whether the battery is being charged. In operation 1145, when the executable edge computing service is a service that requires a large amount of battery consumption, the leaf device may exclude an edge device, the battery of which is not being charged, as a device unavailable for the service.

According to various embodiments, in operation 1150, the leaf device may identify whether there is an edge computing service in which each edge device is connected to a different leaf device and operates. In operation 1155, the leaf device may identify whether computing resources for an edge computing service with the leaf device according to the capability of each edge device are sufficient, and may exclude a device, the computing resource of which is insufficient, as a device unavailable for the service.

According to various embodiments, in operation 1160, the leaf device may identify whether each edge device is in a sleep state. In operation 1165, the leaf device may lower the priority of the edge device in the sleep state.

According to various embodiments, in operation 1170, the leaf device may identify whether a high-end application is being executed by each edge device. In operation 1175, the leaf device may lower the priority of the edge device executing the high-end application.

According to various embodiments, in operation 1180, the leaf device may generate second recommendation information including at least one edge device and transmit the generated second recommendation information to the IoT server.

Figure 12A:
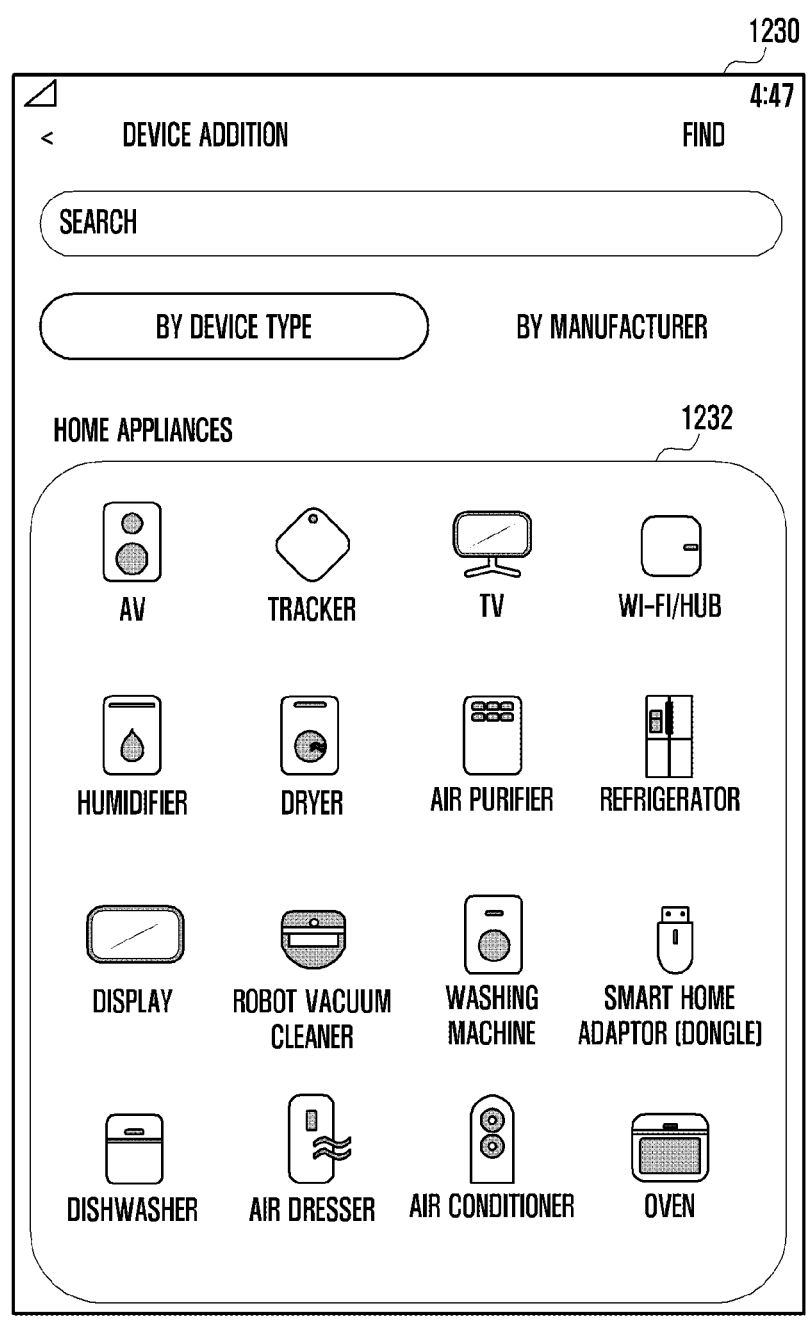
FIGS. 12A and 12B illustrate an example application screen of a user device according to various embodiments.
Figure 12B:
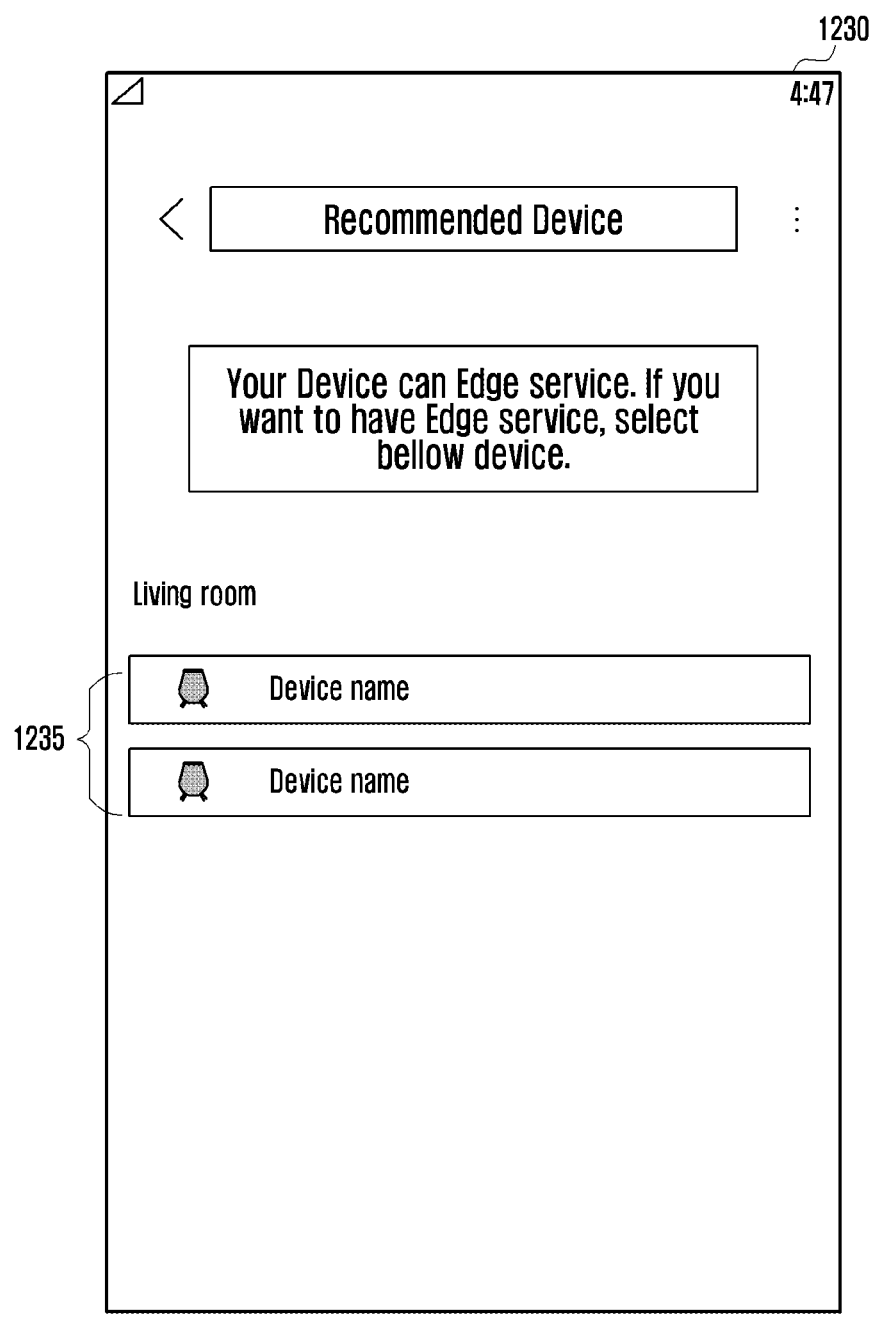

FIGS. 12A and 12B illustrate example application screens of a user device according to various embodiments.

According to various embodiments, a user device (e.g., the user device 230 of FIG. 2A or the user device 300 of FIG. 3) may provide a function of registering, in an IoT server (e.g., the IoT management server 240 of FIG. 2A), an edge device (e.g., the edge device 210 of FIG. 2A or the edge device 400 of FIG. 4) and a leaf device (e.g., the leaf device 220 of FIG. 2A or the leaf device 500 of FIG. 5) through an application.

Referring to FIG. 12A, a user device 1230 may search for IoT devices capable of performing edge computing services in a home network and display the retrieved IoT devices on an application 1232.

The user device 1230 may transmit device information of a device selected according to a user input on the application to the IoT server, so as to request registration of the device. In addition, the user device 1230 may receive a name of each device, whether the device is a leaf device or an edge device, location information, and the like on the application.

Referring to FIG. 12B, the user device 1230 may receive the second recommendation information generated by the edge device or the leaf device through the IoT server and display the generated second recommendation information (indicated by reference numeral 1235). The user device 1230 may display a list of edge devices or leaf devices included in the second recommendation information on the application, and may select a device to be connected with the previously registered device based on the user's input. The user device 1230 may transmit information on the selected device to the IoT server, and accordingly, the two devices may be connected to each other to perform an edge computing service.

Figure 13:
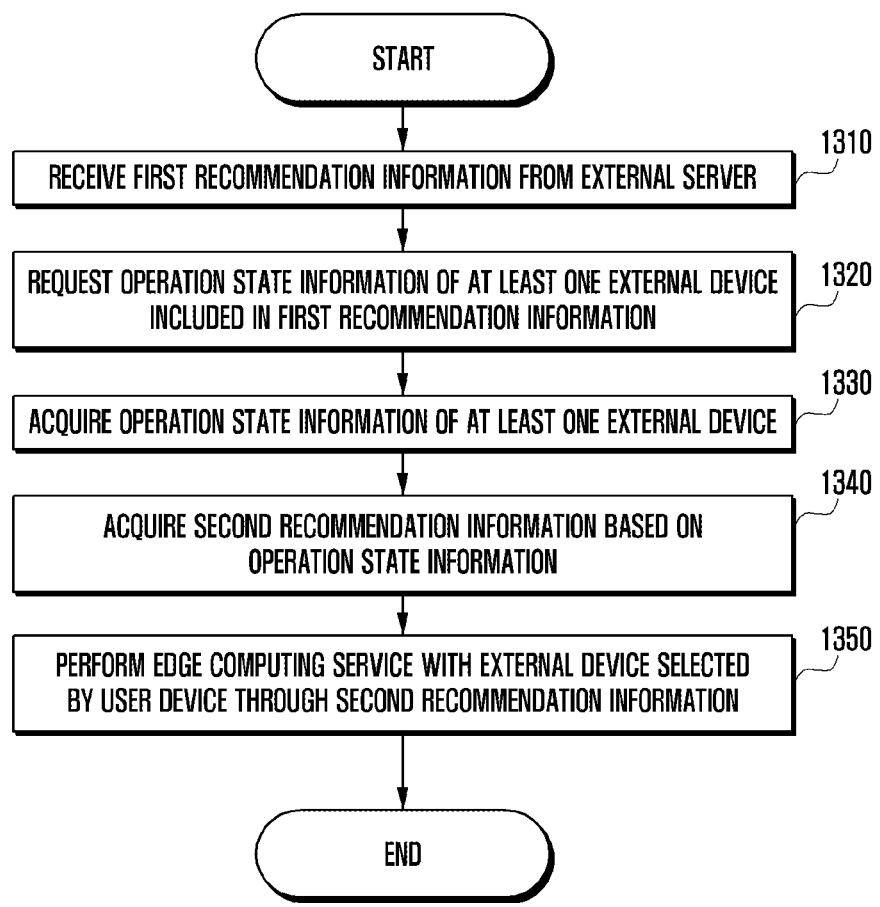
FIG. 13 is a flowchart illustrating a method for recommending a connection device by an example electronic device according to various embodiments.

FIG. 13 is a flowchart illustrating an example method for recommending a connection device by an electronic device according to various embodiments.

The illustrated method may be performed by an edge device (e.g., the edge device 210 of FIG. 2A or the edge device 400 of FIG. 4) or a leaf device (e.g., the leaf device 220 of FIG. 2A or the leaf device 500 of FIG. 5), and the description of the technical features described above will not be repeated.

According to various embodiments, in operation 1310, the electronic device may receive, from an IoT server (e.g., the IoT server of FIG. 2A), first recommendation information including a list of at least one external device which may be connected to the electronic device through edge computing. For example, when the electronic device may operate as a leaf device, the electronic device may be added to a home network while multiple edge devices exist on the home network and registered in the IoT server. In this case, the IoT server may identify device information (or cloud parameters) of the multiple edge devices on the home network and the electronic device, and determine at least one edge device suitable for connection with the electronic device having requested registration, based on the device information of each device, so as to transmit first recommendation information including a list of the determined edge devices to the electronic device.

According to various embodiments, in operation 1320, the electronic device may request operation state information from at least one external device included in the first recommendation information. For example, the operation state information may include at least a part of whether the device wakes up or sleeps, an application running in the foreground, a connection state of a local network, IP address information, a wireless communication state, or signal strength. According to various embodiments, at least some of the operation state information and the device information may overlap each other or belong to other information. According to an embodiment, the electronic device may establish a communication connection with at least one external device included in the first recommendation information to request transmission of the operation state information therethrough. Further, according to an embodiment, the electronic device may broadcast a signal including a request for transmission of operation state information.

According to various embodiments, in operation 1330, the electronic device may acquire operation state information from each external device. For example, the external device may receive a request for transmission of operation state information through a wireless connection with the electronic device or a broadcast signal and, in response to the request, may identify the operation state information of the external device and transmit the identified operation state information to the electronic device.

According to various embodiments, in operation 1340, the electronic device may acquire second recommendation information including a list of at least one external device to be connected through edge computing based on the operation state information of the at least one external device. For example, a device suitable for connection with the electronic device may be determined based on at least part of whether the electronic device and each external device wake up or sleep, an application running in the foreground, a connection state of a local network, IP address information, a wireless communication state, or a signal strength. The electronic device may transmit the generated second recommendation information to the IoT server.

According to various embodiments, in operation 1350, an edge computing service may be performed while being connected to an external device, which is selected by the user device, among at least one external device of the second recommendation information. The IoT server may transmit the second recommendation information to the user device, and the user device may receive a selection of at least one of external devices included in the second recommendation information through an application.

For example, when an electronic device which is a leaf device and an external device which is an edge device are connected to each other, the electronic device may transmit data (e.g., video streaming) acquired using a sensor to the external device. The external device may analyze data received from the electronic device and transmit sensor data and analysis data of the electronic device to the IoT server.

Figure 14:
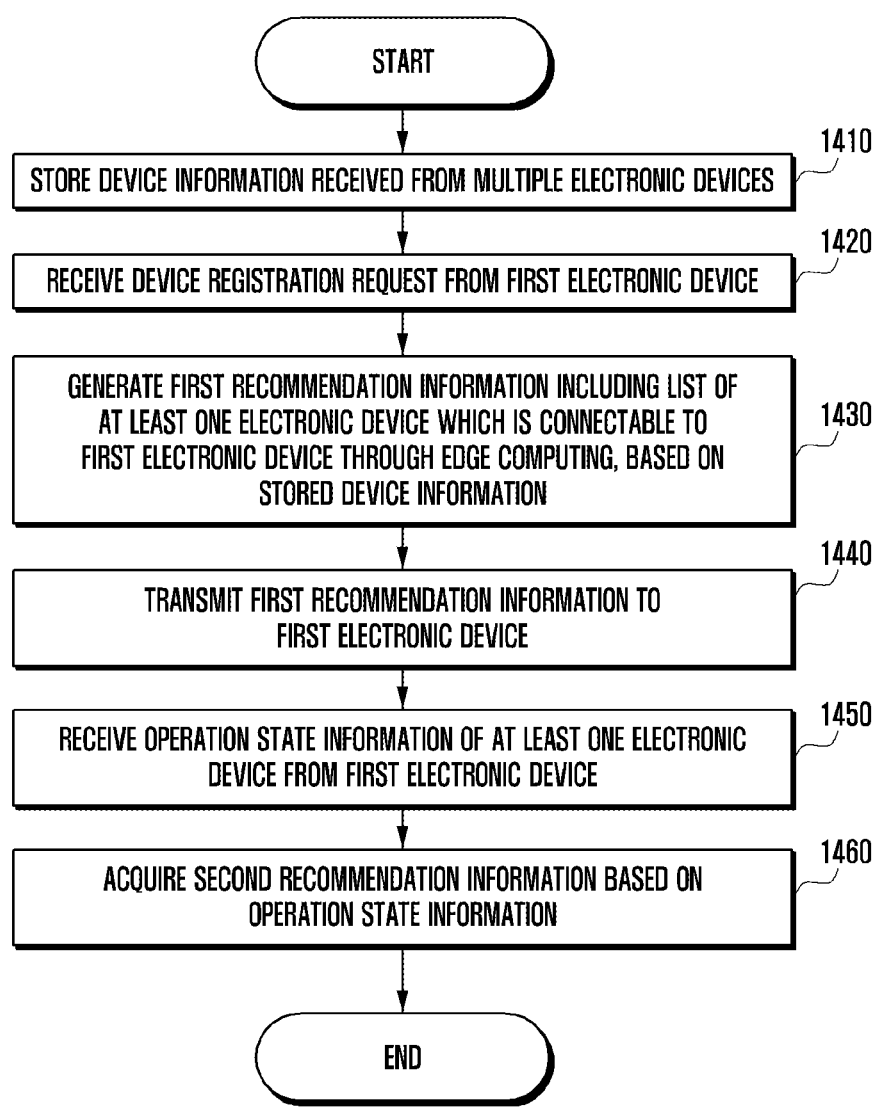
FIG. 14 is a flowchart illustrating a method for recommending a connection device by an example IoT server according to various embodiments.

FIG. 14 is a flowchart illustrating an example method for recommending a connection device by an IoT server according to various embodiments.

The illustrated method may be performed by an IoT server (e.g., the IoT management server 240 of FIG. 2A or the IoT server 260 of FIG. 2B), and the description of the technical features described above will be omitted.

According to various embodiments, in operation 1410, the IoT server may receive and store device information from multiple electronic devices. The multiple electronic devices may transmit device information during registration, and may transmit variable device information among device information to the IoT server periodically or upon occurrence of a predetermined event.

According to various embodiments, in operation 1420, the IoT server may receive a device registration request from a first electronic device.

According to various embodiments, in operation 1430, the IoT server may generate first recommendation information including a list of at least one electronic device which may be connected to a first electronic device among multiple electronic devices through edge computing, based on the stored device information.

According to various embodiments, the IoT server may identify whether the first electronic device may operate as an edge device or a leaf device of the edge computing service, based on device information of the first electronic device that has requested device registration. When the first electronic device may operate as an edge device of the edge computing service, the IoT server may generate first recommendation information including a list of at least one leaf device which may be connected to the first electronic device and, when the first electronic device may operate as a leaf device of the edge computing service, the IoT server may generate first recommendation information including a list of at least one edge device which may be connected to the first electronic device.

According to various embodiments, the IoT server may generate the first recommendation information based on fixed device information including at least one of a device model name, an account, location information, an executable edge computing service, service capability, and a weight configured by a user, and variable device information including at least one of an online or offline state, a battery state, a resource usage amount, and an edge computing service being executed.

According to various embodiments, in operation 1440, the IoT server may transmit first recommendation information to the first electronic device.

According to various embodiments, in operation 1450, the IoT server may receive operation state information of at least one electronic device from the first electronic device. The operation state information may include a local parameter obtained by the first electronic device through connection with the at least one electronic device.

According to various embodiments, in operation 1460, the IoT server may acquire second recommendation information based on the received operation state information. For example, the IoT server may determine a device suitable for connection with an electronic device based on whether each device wakes up or sleeps, an application running in the foreground, a connection state of a local network, and IP address information.

According to an embodiment, an operation of generating and acquiring the second recommendation information may be performed by the first electronic device. In this case, operations 1450 and 1460 may be omitted.

An electronic device according to various embodiments may include a communication module (e.g., including a communication circuit); a memory; and a processor operatively connected to the communication module and the memory, wherein the processor is configured to: transmit device information of the electronic device to an external server using the communication module; receive, from the external server, first recommendation information including a list of at least one external device which is connectable to the electronic device through edge computing; request transmission of operation state information from the at least one external device included in the first recommendation information; acquire the operation state information of the at least one external device; and acquire second recommendation information including a list of at least one external device to be connected through edge computing, based on the operation state information of the at least one external device.

According to various embodiments, the processor may be configured to: generate the second recommendation information including a priority of the at least one external device based on the acquired operation state information of the at least one external device; or transmit the acquired operation state information of the at least one external device to the external server, and receive the second recommendation information from the external server.

According to various embodiments, in a case that the electronic device is operable as an edge device of an edge computing service, the first recommendation information may include a list of at least one leaf device which is connectable to the electronic device, and in a case that the electronic device is operable as a leaf device of the edge computing service, the first recommendation information may include a list of at least one edge device which is connectable to the electronic device.

According to various embodiments, the first recommendation information may be generated by the external server, based on device information of the electronic device and multiple external devices stored in the external server.

According to various embodiments, the device information of the electronic device and the external devices stored in the external server may include: fixed device information including at least one of a device model name, an account, location information, an executable edge computing service, a service capability, and a weight configured by a user; and variable device information including at least one of an online or offline state, battery state, a resource usage amount, and an edge computing service being executed.

According to various embodiments, the processor may be configured to transmit the variable device information of the electronic device to the external server periodically or upon occurrence of a predetermined event.

According to various embodiments, the operation state information of the external device may include at least one of a wake-up or sleep state, a foreground running application, and network connection information.

According to various embodiments, the processor may be configured to determine a score of each external device based on each parameter of the operation state information of the external device, and generate second recommendation information including the determined score.

According to various embodiments, the processor may be configured to perform an edge computing service while being connected to an external device, which is selected by a user device from among at least one external device of the second recommendation information.

A method for recommending a connection device by an IoT server according to various embodiments may include: storing device information received from multiple electronic devices; receiving a device registration request from a first electronic device; generating first recommendation information including a list of at least one electronic device, which is connectable to the first electronic device through edge computing, among the multiple electronic devices, based on the stored device information; transmitting the first recommendation information to the first electronic device; receiving, from the first electronic device, operation state information of the at least one electronic device included in the first recommendation information; and based on the operation state information, generating second recommendation information including a list of at least one external device which is connectable to the first electronic device through the edge computing, or receiving the second recommendation information from the first electronic device.

According to various embodiments, the method may further include transmitting the generated second recommendation information to a user device associated with the first electronic device.

According to various embodiments, the generating of the first recommendation information may include: identifying whether the first electronic device is operable as an edge device or a leaf device of an edge computing service, based on device information of the first electronic device; in a case that the first electronic device is operable as the edge device of the edge computing service, generating first recommendation information including a list of at least one leaf device which is connectable to the first electronic device; and in a case that the first electronic device is operable as the leaf device of the edge computing service, generating first recommendation information including a list of at least one edge device which is connectable to the first electronic device.

According to various embodiments, the generating of the first recommendation information may include generating the first recommendation information based on fixed device information including at least one of a device model name, an account, location information, an executable edge computing service, a service capability, and a weight configured by a user, and variable device information including at least one of an online or offline state, a battery state, a resource usage amount, and an edge computing service being executed.

According to various embodiments, the generating of the second recommendation information may include determining a score of each electronic device based on each parameter of the operation state information of the at least one electronic device, and generating second recommendation information including the determined score.

A method for recommending a connection device by an electronic device according to various embodiments may include: transmitting device information of the electronic device to an external server; receiving, from the external server, first recommendation information including a list of at least one external device which is connectable to the electronic device through edge computing; requesting transmission of operation state information from the at least one external device included in the first recommendation information; acquiring the operation state information of the at least one external device, and based on the operation state information of the at least one external device, acquiring second recommendation information including a list of at least one external device to be connected through edge computing.

According to various embodiments, the acquisition of the second recommendation information may include: generating the second recommendation information including a priority of the at least one external device based on the acquired operation state information of the at least one external device; or transmitting the acquired operation state information of the at least one external device to the external server, and receiving the second recommendation information from the external server.

According to various embodiments, in a case that the electronic device is operable as an edge device of an edge computing service, the first recommendation information may include a list of at least one leaf device which is connectable to the electronic device, and in a case that the electronic device is operable as a leaf device of the edge computing service, the first recommendation information may include a list of at least one edge device which is connectable to the electronic device.

According to various embodiments, the operation state information of the external device may include at least one of a wake-up or sleep state, a foreground running application, and network connection information.

According to various embodiments, the acquisition of the second recommendation information may include: determining a score of each external device based on each parameter of the operation state information of the external device; and generating second recommendation information including the determined score.

According to various embodiments, the method may further include performing an edge computing service while being connected to an external device, which is selected by a user device from among at least one external device of the second recommendation information.

The electronic device (e.g., the user device, the leaf device, and the edge device of FIG. 2A) according to various embodiments disclosed in the disclosure may be configured by various types of devices. The electronic device may include, for example, a portable communication device (e.g., a smart phone), a computer device, a portable multimedia device, a portable medical device, a camera, a wearable device, a home appliance device, or the like. The electronic device according to the embodiment of the disclosure is not limited to the above-described devices.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 340) including one or more instructions that are stored in a storage medium (e.g., internal memory 336 or external memory 338) that is readable by a machine (e.g., the electronic device 301). For example, a processor (e.g., the processor 320) of the machine (e.g., the electronic device 301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium which refers, for example, to a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a communication module;
a memory; and a processor operatively connected to the communication module and the memory, wherein the processor is configured to:
- transmit device information of the electronic device to an external server using the communication module;
- receive, from the external server, first recommendation information including a list of at least one external device which is connectable to the electronic device through edge computing;
- request transmission of operation state information of the at least one external device included in the list of the first recommendation information, to the at least one external device;
- receive the operation state information of the at least one external device, from the at least one external device; and
- based on the operation state information of the at least one external device, acquire second recommendation information including a list of at least one external device to be connected through edge computing.

2. The electronic device of claim 1, wherein the processor is configured to:
- generate the second recommendation information including a priority of the at least one external device based on the received operation state information of the at least one external device; or
- transmit the received operation state information of the at least one external device to the external server, and receive the second recommendation information from the external server.

3. The electronic device of claim 1, wherein, in a case that the electronic device is operable as an edge device of an edge computing service, the first recommendation information includes a list of at least one leaf device which is connectable to the electronic device, and
wherein, in a case that the electronic device is operable as a leaf device of the edge computing service, the first recommendation information includes a list of at least one edge device which is connectable to the electronic device.

4. The electronic device of claim 1, wherein the first recommendation information is generated by the external server, based on device information of the electronic device and multiple external devices stored in the external server.

5. The electronic device of claim 4, wherein the device information of the electronic device and the external devices stored in the external server comprises:
- fixed device information including at least one of a device model name, an account, location information, an executable edge computing service, a service capability, and a weight configured by a user; and
- variable device information including at least one of an online or offline state, a battery state, a resource usage amount, and an edge computing service being executed.

6. The electronic device of claim 5, wherein the processor is configured to transmit the variable device information of the electronic device to the external server periodically or upon occurrence of a predetermined event.

7. The electronic device of claim 1, wherein the operation state information of the external device includes at least one of a wake-up or sleep state, a foreground running application, or network connection information.

8. The electronic device of claim 7, wherein the processor is configured to determine a score of each external device based on each parameter of the operation state information of the external device, and generate the second recommendation information including the determined score.

9. The electronic device of claim 1, wherein the processor is configured to perform an edge computing service while being connected to an external device, which is selected by a user device from among at least one external device of the second recommendation information.

10. A method for recommending a connection device by an IoT server, the method comprising:
- storing device information received from multiple electronic devices;
- receiving a device registration request from a first electronic device;
- generating first recommendation information including a list of at least one electronic device, which is connectable to the first electronic device through edge computing, among the multiple electronic devices, based on the stored device information;
- transmitting the first recommendation information to the first electronic device;
- receiving, from the first electronic device, operation state information of the at least one electronic device included in the first recommendation information; and
- based on the operation state information, generating second recommendation information including a list of at least one external device which is connectable to the first electronic device through the edge computing, or receiving the second recommendation information from the first electronic device.

11. The method of claim 10, further comprising transmitting the generated second recommendation information to a user device associated with the first electronic device.

12. The method of claim 10, wherein the generating of the first recommendation information comprises:
- identifying whether the first electronic device is operable as an edge device or a leaf device of an edge computing service, based on device information of the first electronic device;
- in a case that the first electronic device is operable as the edge device of the edge computing service, generating first recommendation information including a list of at least one leaf device which is connectable to the first electronic device; and
- in a case that the first electronic device is operable as the leaf device of the edge computing service, generating first recommendation information including a list of at least one edge device which is connectable to the first electronic device.

13. The method of claim 12, wherein the generating of the first recommendation information comprises generating the first recommendation information based on: fixed device information including at least one of a device model name, an account, location information, an executable edge computing service, a service capability, and a weight configured by a user; and variable device information including at least one of an online or offline state, a battery state, a resource usage amount, or an edge computing service being executed.

14. The method of claim 10, wherein the generating of the second recommendation information comprises determining a score of each electronic device based on each parameter of the operation state information of the at least one electronic device, and generating second recommendation information including the determined score.

15. A method for recommending a connection device by an electronic device, the method comprising:
- transmitting device information of the electronic device to an external server;

receiving, from the external server, first recommendation information including a list of at least one external device which is connectable to the electronic device through edge computing;

requesting transmission of operation state information of the at least one external device included in the list of the first recommendation information, to the at least one external device;

receiving the operation state information of the at least one external device from the at least one external device, and based on the operation state information of the at least one external device, acquiring second recommendation information including a list of at least one external device to be connected through edge computing.

\* \* \* \* \*